United States Patent
Fligler et al.

(10) Patent No.: US 7,689,455 B2
(45) Date of Patent: Mar. 30, 2010

(54) ANALYZING AND DETECTING ANOMALIES IN DATA RECORDS USING ARTIFICIAL INTELLIGENCE

(75) Inventors: Ariel Fligler, Hod-Hasharon (IL); Yoram Dayagi, Haifa (IL); Avraham Haleva, Lezion (IL); Sharon Mashal, Ness Ziona (IL)

(73) Assignee: Olista Ltd., Netanya (IL)

( * ) Notice: Subject to any disclaimer, the term of this patent is extended or adjusted under 35 U.S.C. 154(b) by 651 days.

(21) Appl. No.: 11/129,290

(22) Filed: May 16, 2005

(65) Prior Publication Data

US 2006/0229931 A1   Oct. 12, 2006

Related U.S. Application Data

(60) Provisional application No. 60/669,010, filed on Apr. 7, 2005.

(51) Int. Cl.
*G06F 17/30* (2006.01)

(52) U.S. Cl. ........................................ 705/10
(58) Field of Classification Search .................. 705/10
See application file for complete search history.

(56) References Cited

U.S. PATENT DOCUMENTS

| | | | | |
|---|---|---|---|---|
| 5,528,516 A * | 6/1996 | Yemini et al. | | 702/181 |
| 6,012,152 A * | 1/2000 | Douik et al. | | 714/26 |
| 6,147,975 A * | 11/2000 | Bowman-Amuah | | 370/252 |
| 6,249,755 B1 * | 6/2001 | Yemini et al. | | 702/183 |
| 6,449,588 B1 * | 9/2002 | Bowman-Amuah | | 703/21 |
| 6,493,723 B1 * | 12/2002 | Busche | | 707/104.1 |
| 6,529,954 B1 * | 3/2003 | Cookmeyer et al. | | 709/224 |
| 6,556,659 B1 * | 4/2003 | Bowman-Amuah | | 379/9.04 |
| 6,704,874 B1 * | 3/2004 | Porras et al. | | 726/22 |
| 6,807,156 B1 * | 10/2004 | Veres et al. | | 370/252 |
| 7,089,592 B2 * | 8/2006 | Adjaoute | | 726/25 |
| 7,225,343 B1 * | 5/2007 | Honig et al. | | 713/194 |
| 7,275,017 B2 * | 9/2007 | Dini et al. | | 702/182 |
| 7,334,001 B2 * | 2/2008 | Eichstaedt et al. | | 707/104.1 |
| 7,383,191 B1 * | 6/2008 | Herring et al. | | 705/1 |
| 2004/0015719 A1 * | 1/2004 | Lee et al. | | 713/201 |
| 2004/0153533 A1 * | 8/2004 | Lewis | | 709/223 |
| 2005/0222806 A1 * | 10/2005 | Golobrodsky | | 702/179 |
| 2006/0242706 A1 * | 10/2006 | Ross | | 726/23 |

OTHER PUBLICATIONS

Netcool White Paper—Netcool Suite Functionality & Benefits Micromuse Inc., Jul. 1999.*
Copeland, John A. et al., Real-Time Anomaly Detection Using Soft-Computing Techniques IEEE, 2001.*
Distocraft brings wireless network performance management to a new level, increases versatility and cost efficiency M2 Presswire, Nov. 10, 2003.*

(Continued)

*Primary Examiner*—Scott L Jarrett
(74) *Attorney, Agent, or Firm*—Pearl Cohen Zedek Latzer, LLP

(57) ABSTRACT

A device, system and method for data monitoring, collection and analysis. A method may include creating one or more context insight records representing an indication of a behavior of a service based on raw footprint data related to use of said service by a population of users, and analyzing said one or more context insight records to detect a dynamically defined anomaly of said service.

39 Claims, 13 Drawing Sheets

OTHER PUBLICATIONS

Reddy, Y.B., A Machine Learning Approach for Anomaly Detection Using Genetic Algorithm Proceedings Intelligent Systems and Control 2004, Abstract.*
Dianati, Mehrdad, An Introduction to Genetic Algorithms and Evolution Strategies University of Waterloo of Canada, 2002.*
Li, Wei, Using Genetic Algorithm for Network Intrusion Detection Mississippi State University, 2004.*
Leon, Elizabeth, Anomaly Detection Based on Unsupervised Niche Clustering with Application to Network Intrusion Detection IEEE, 2004.*
Gemini Backs New Business Process Assurance Venture Olista, May 17, 2004.*
Tsang, Chi-Ho et al., Anomaly Intrusion Detection Using Multi-Objective Genetic Fuzzy SYstem and Agent-Based Evolutionary Computation Framework, IEEE, 2005.*
Argogroup: Olista and Agrogroup deliver integrated solutions to drive MobileData Services Uptake M2 Presswire, May 17, 2005.*
Pal, Sankar K et al., Genetic Algorithms for Pattern Recognition CRC Press Inc., 1996, ISBN 0-8493-9467-8.*
Mena, Jesus, Data Mining Your Website Butterworth-Heinemann, 1999, ISBN 1-5558-222-2.*
Genetic Algorithm Wikipedia.org, Retrieved Oct. 1, 2007.*
Teng et al., Adaptive Real-time Anomaly Detection Using Inductively Generated Sequentially Patterns IEEE, 1990.*
Vafaie et al., Genetic Algorithms as a Tool for Feature Selection in Machine Learning 4th Conference on Tools With Artificial Intelligence, 1992.*
Chaikla et al., Genetic Algorithms in Feature Selection IEEE 1999.*
Sarafis et al., A Genetic Rule-Based Data Clustering Toolkit Congress on Evolutionary Computing, 2002.*
Uei et al., An Incremental Approach to Genetic Algorithms Based Classification IEEE, 2005.*
Tseng, Lin Yu et al., Genetic Algorithms for Clustering, Feature Selection and Classification IEEE, 1997.*
Reddtm Y.B., A Machine Learning Approach For Anomaly Detection Using Genetic Algorithm $6^{th}$ International Conference on Intelligent Systems and Control 2004.*
Reddy, Y.B., A Machine Learning Approach For Anomaly Detection Using Genetic Algorithms Proceedings of the $6^{th}$ Lasted International Conference, Intelligent Ssstems and Control, 2004.*
Tseng et al., Genetic Algorithms for Clustering, Feature Selection and Classification IEEE 1997.*
Fuller, Wayne, Network Management Using Expert Diagnostics International Journal of Network Managemnt, 1999.*
Muller, Nathan J., Focus on OpenView: A Guide to Hewlett-Packard's Network and Systems Management Platform CBM Books, ISBN 1-878956-48-5, 1995.*
Y.B. Reddy, Genetic Algorithm Approach for Intrusion Detection Grambling State University, Aug. 6, 2004.*

* cited by examiner

ANALYZING AND DETECTING ANOMALIES IN DATA RECORDS USING ARTIFICIAL INTELLIGENCE

PRIOR APPLICATION DATA

This application claims priority from U.S. Provisional Patent Application No. 60/669,010, entitled "Device, System and Method of Data Monitoring, Collection and Analysis", filed on Apr. 7, 2005, and incorporated herein by reference in its entirety.

FIELD OF THE INVENTION

The present invention relates to Information Technology (IT), for example, information monitoring and analysis.

BACKGROUND OF THE INVENTION

Conventional data monitoring tools may utilize a deterministic model of a problem domain. The deterministic model may include a pre-defined, closed set of capabilities and possible states of core components of a system, and the possible interactions between such components. The deterministic model may define a list of all possible failures or problems of the systems, for example, based on the pre-defined possible interactions. For example, when a failure occurs (e.g., when a service fails to operate, or operates poorly), the deterministic model may attempt to trace back the failure to a possible cause, in accordance with the pre-defined list of interactions and symptoms.

Unfortunately, the deterministic model may not detect, or may not efficiently detect, failures and other problems in many existing systems, particularly in complex systems, for example, systems handling millions of daily interactions or transactions, systems having dynamic or fast-changing connections between components, systems combining multiple technologies (e.g., Internet Protocol (IP) technology, voice technology, Information Technology (IT), or the like), systems in which new services are introduced at a relatively fast pace, systems having a relatively short shelf life of services, systems that may not allow full testing of a service (e.g., because not all test cases of a new service may be covered), or the like. Furthermore, the deterministic model may not detect a failure that is not explicitly pre-defined. The above may result in, for example, a relatively poor customer experience and/or quality of service, e.g., slow introduction rates for new services, slow adoption rates for new services, increased service costs, or the like. These deficiencies in service quality may also induce direct and indirect costs to the service provider, for example, refunds or other compensation to unsatisfied customers and handling a high number of complaints from customers or business partners.

SUMMARY OF THE INVENTION

Some embodiments of the invention may include, for example, devices, systems and method of data collection, monitoring and analysis.

Some embodiments of the invention may include, for example, identification and reporting of flow-related, functional and/or logical problems in business processes.

Some embodiments of the invention may include, for example, a "model-free" solution. e.g., capability to detect and resolve previously undefined problems. For example, a monitoring system or method in accordance with some embodiments of the invention may detect anomalies and problems that have not been pre-defined, e.g., without reference to a set or list of pre-defined problems.

Some embodiments of the invention, for example, may allow an end-to-end view of services, by creating aggregated data structures that describe a service's functional and logical "health" (e.g., consistency, coherency, validity, or the like) and provide a focal point with an end-to-end view of the service.

Some embodiments of the invention, for example, may include adaptable models backed by problem domain (e.g., mobile communications) knowledge, which may include models and methodology that are specific for the investigated domain. The models may include behaviors, experiences, and a set of pre-built components that ease the integration of the monitoring system with the operators' technical infrastructure.

Some embodiments of the invention may allow reconstruction of customers' experiences using aggregation, correlation and knowledge-based technique. The monitoring system or method may manage and identify the experiences or problems of individual customers, or larger populations with specific characteristics, in substantially real-time. In some embodiments, once experience semantics are defined, they may be used throughout the system.

In some embodiments of the invention, the monitoring system or method may dynamically (e.g., in substantially real time, or during the operation of the monitored system or service) build quality indicators that may detect previously undefined problems of variable sized, highly-specific customer sub-populations. The dynamic quality indicators may be constructed based on real-world transaction usage data, and may adapt to an actual system state.

In some embodiments of the invention, the monitoring system or method may "evolve" (e.g., dynamically modify, adapt or re-define) quality indicators that are determined to be more useful, e.g., quality indicators that describe current system failure states. The quality indicators may have high granularity and may allow definition of highly characterized sub-populations and behaviors.

In some embodiments of the invention, the monitoring system or method may detect and resolve chronic experience problems, thereby eliminating or reducing the need to pre-define experience problems and/or the need to monitor pre-defined symptoms.

Systems and methods in accordance with some embodiments of the invention may provide a holistic, comprehensive, end-to-end view of the service and/or the delivery chain, and may allow runtime assurance of service experiences.

Embodiments of the invention may allow various other benefits, and may be used in conjunction with various other applications.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
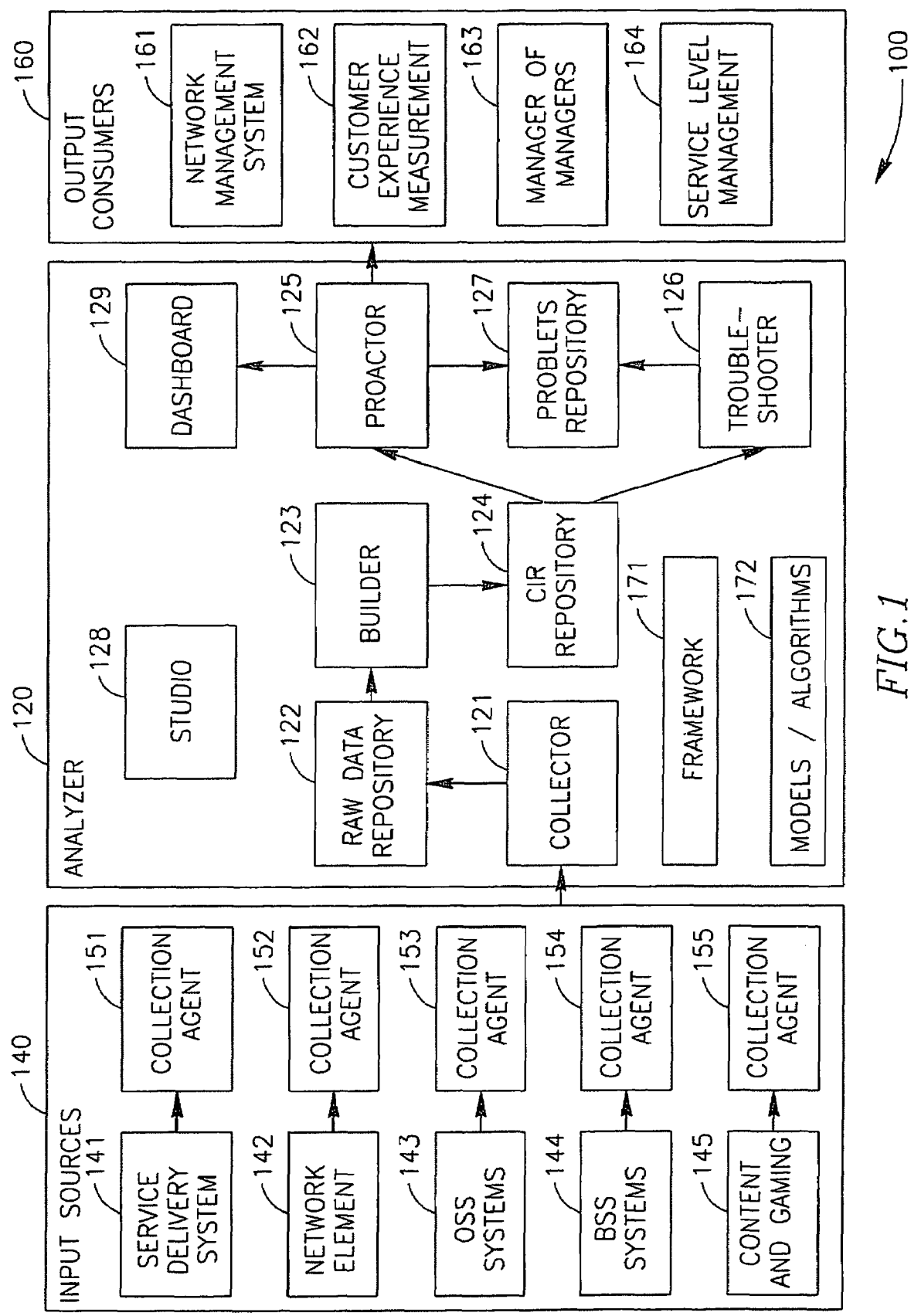
FIG. 1 is a schematic illustration of a monitoring system in accordance with some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the invention will be described. For purposes of explanation, specific configurations and details are set forth in order to provide a thorough understanding of the invention. However, it will also be apparent to one skilled in the art that the invention may be practiced without the specific details presented herein. Furthermore, well-known features may be omitted or simplified in order not to obscure the invention.

Although art of the discussion herein may relate, for exemplary purposes, to data monitoring, collection and/or analysis in relation to Information Technology (IT) systems, or in connection with a telecommunication system or a cellular or wireless communication system, embodiments of the invention are not limited in this regard, and may be used in conjunction with various other applications, environments, fields and/or systems, for example, financial systems, banking applications, insurance applications, programming environments, wired or wireless communication systems, computer-related or Internet-related systems, online applications, pharmaceutical systems, Service Oriented Architecture (SOA) infrastructures, industrial value chain processes, or other fields.

FIG. 1 schematically illustrates a system 100 in accordance with some embodiments of the invention. System 100 may include, for example, an analyzer 120 which may receive input from one or more input sources 140, and may produce output to one or more output consumers 160. System 100 may include other suitable hardware components and/or software component.

Input sources 140 may include one or more information sources, for example, core network components, network data (e.g., transactions database, operations database, log files, history data, or the like), enrichment sources (e.g., data sources which perform data modification or data enrichment, supervising components, collaborating sources having relating information, or the like), or other components having relevant information.

For example, in one embodiment (e.g., in the field of mobile telecommunications, or other fields), input sources 140 may include a service delivery system 141, a network element 142, an Operational Support System/Operations Service and Support System (OSS) 143, a Billing Support System/Business Support System (BSS) 144, a content and gaming information source 145, and/or other (e.g., distributed or disparate) input sources.

Data from input sources 140 may be transferred to analyzer 120 directly, or through an interface or one or more collection agents 151-155, which may collect data, re-format data, convert data from a first format or standard to a second format or standard, prepare or modify data to be readily available (e.g., in accordance with a pre-defined format, protocol or standard) for handling by analyzer 120 or for communication to analyzer 120, or the like. For example, input sources 141-145 may be operationally associated with collection agents 151-155, respectively.

Analyzer 120 may include, for example, a collector module 121, a raw data repository 122, a builder module 123, a Context Insight Record (CIR) repository 124, a proactor module 125, a troubleshooter module 126, a problets repository 127, a studio module 128, and a dashboard module 129. Analyzer 120 may include other suitable hardware components and/or software component.

Collector module 121 may include, for example, a module (or multiple modules, e.g., distributed modules or agents) able to collect data from one or more information sources, input sources (e.g., input sources 140-145), or collection agents (e.g., collection agents 151-155). The collector module 121 may, for example, receive data in accordance with one or more formats, e.g., text (TXT) files or data, eXtensible Markup Language (XML) files or data, HyperText Markup Language (HTML) files or data, Structured Query Language (SQL) files or data, or the like. The collector module 121 may, for example, receive data in accordance with one or more communication protocols, e.g., Transmission Control Protocol (TCP), Internet Protocol (IP), TCP/IP, HyperText Transfer Protocol (HTTP), or other data access protocols or data transfer protocols. The collector module 121 may, for example, use or include a push mechanism and/or a pull mechanism, e.g., using synchronous and/or asynchronous protocols.

In one embodiment, collector module 121 may operate in a non-intrusive way, such that data may be fed into collector module 121 (e.g., from collection agents 151-152) or otherwise collected without "burdening" the actual service components. In another embodiment, collector module 121 may actively search for information or actively obtain information, e.g., by probing or querying one or more input sources 140.

Collector module 121 may store collected data in raw data repository 122, which may include, for example, a storage unit or memory unit. In one embodiment, for example, data may optionally be stored in raw data repository 122 using substantially the same format in which the data was received or collected by collector module 121, e.g., as "raw" or unprocessed data.

Builder module 123 may access the raw data repository 122, may read and process data stored in the raw data repository 122, and may create CIRs which may be stored in the CIR repository 124. In one embodiment, for example, a CIR may include a data item (e.g., a record, a field, a file, an indication, a message, or the like) representing an aggregated end-to-end view of a service customers' experiences, logical and/or functional health. The builder module 123 may generate CIRs, for example, based on the data or data streams collected from the input sources 140, using one or more data aggregation techniques and, optionally, using one or more models or algorithms of data behavior fingerprints, transaction fingerprints, failures fingerprints, abnormalities fingerprints, or the like.

In one embodiment, the CIRs created by builder module 123 and/or stored in CIR repository 124 may be used to research a user experience of an individual customer or user. In another embodiment, the CIRs created by builder module 123 and/or stored in CIR repository 124 may be used to research an aggregated user experience, e.g., a user experience of multiple users, a population of users or customers, a segment of users or customers, or the like.

The proactor module 125 may proactively monitor customer experiences, e.g., on an ongoing basis, continuously, periodically, in real time, substantially in real time, on demand, in response to a triggering event or condition, or the like. In some embodiments, the proactor module 125 may monitor and/or examine quality parameters (e.g., integrity, logical integrity, functional integrity, or the like) of one or more services or applications, using an adaptive core mechanism able to detect hidden anomalies or evolving anomalies.

In some embodiments, the proactor module 125 may detect anomalies that were not specifically pre-defined, e.g., based on or using a behavioral algorithm, a genetic algorithm, a genetic-like algorithm, machine learning algorithm, artificial intelligence algorithm, heuristic or meta-heuristic algorithm, or the like. In one embodiments, upon detection of an anomaly, anomaly-related data (e.g., data indicating the existence of the anomaly, data indicating properties of the anomaly, supportive resolution information, or the like) may be transferred to other components of analyzer 120, e.g., to the troubleshooter module 126.

The troubleshooter module 126 may include an analysis and research environment (e.g., a visual environment, a User Interface (UI) environment, a Graphic UI (GUI) environment, an online environment, or the like) for service experience assurance. The troubleshooter module 126 may include, or may be associated with, for example, research tools, analysis algorithms, and/or supporting models. The troubleshooter module 126 may allow resolution of known problems or anomalies, evolving problems or anomalies, and/or previously-unknown problems or anomalies.

In some embodiments, the troubleshooter module 126 may allow, for example, knowledge management, interactive communication between users or components involved in the problem resolution process, and a process-wide (e.g., end-to-end) and detailed analysis of the customer's experience. The troubleshooter module 126 may use, for example, statistical analysis and/or model-based analysis to perform root cause identification of functional and/or logical problems or anomalies.

In some embodiments, the troubleshooter module 126 may include, for example, a GUI-based environmental supporting automation, and one or more complexity-reduction tools. In one embodiment, for example, the troubleshooter module 126 may include one or more assurance models to create (or to support the creation of) a global view of a problem space and/or automation of research activities.

In some embodiments, a problem or anomaly detected by the proactor module 125, and/or analyzed or researched by the troubleshooter module 126, may be represented using a pre-defined format, e.g., an abstract generic format which may be referred to as "problets". In some embodiments, problets may be stored (e.g., by the proactor module 125 and/or the troubleshooter module 126) into the problets repository 127, or other suitable storage unit or memory unit. Problets may include, for example, supportive information (e.g., resolution procedures). In some embodiments, problets stored in the problets repository 127 may be used for rapid resolution of identical or similar problems or anomalies, e.g., in case of re-occurrence. In some embodiments, problets stored in the problets repository 127 may include organizational information on resolution or occurrence statistics and co-occurrence dependency.

In some embodiments, the troubleshooter module 126 may allow traversing a hypothetical graph composed of nodes that represent a population investigated with a certain analytical tool. The troubleshooter module 126 may find the combination of data and analytical view on the data that will best (or relatively efficiently) expose the anomaly. Since for a medium-size or large-size domain, the number of possible nodes may be extremely large or infinite, the troubleshooter module 126 may perform a smart search by generating nodes that serve as starting points for research, tools to traverse the graph by creating new nodes, and analysis algorithms to evaluate nodes.

The troubleshooter module 126 may include or use an investigation thread. For example, each investigation may be correlated with an investigation thread which encapsulates all data, conclusions and activities that were performed in favor of a certain investigation. Each investigation thread may have (or may be associated with) an investigation graph, having investigation nodes and describing or representing the path of investigation performed. Each investigation node may describe a data/view pair; the data may include a certain population of CIRs, and the view may include analytical tools used to analyze the population. For example, a view may include multivariate statistics (e.g., average, sum, deviation, or the like) of each of the dimensions in the CIRs.

The investigation graph of troubleshooter module 126 may perform one or more operations, for example: a "new root" operation, which creates a new CIR population for research; a "refine" operation, to refine the characteristics of a population node by adding additional criteria, e.g., if the user wishes to focus his attention on a certain sub-population; a "split" operation to split a population node into several sub-populations based on certain criteria (e.g., based on different values of a certain dimension), thereby allowing the user to further investigate each sub-population or compare between sub-populations; an "investigate" operation to execute an anomaly finder algorithm (e.g., as described herein) locally on the population contained within the population node; a "complementary" operation to split the population into two or more sub-populations based on a certain rule or criteria (e.g., a "good" sub-population and a "bad" sub-population, based on a pass/fail condition, or dimension value segmentation, respectively); a "compare" operation to compare between two or more populations, e.g., to quickly find common denominators or differentiators; a "recalculate" operation to modify an attribute of a node and recalculate information for all descendant nodes and/or connected nodes; and/or other suitable operations.

The troubleshooter module 126 may traverse the graph by utilizing one or more operations, for example: supplying new root nodes from which to start an investigation (e.g., based on anomaly detection algorithm alerts from the proactor module 125); detecting anomalies in a certain population (e.g., using the "investigate" operation); supplying actions for creation of related new nodes, for examples, actions supporting the flow and advancement of the research (e.g., "complementary" operation, "refine" operation, "split" operation, "compare" operation); automatically repeating actions or patterns; or the like. In one embodiment, for example, the modeling may include a set of pre-defined investigation patterns that may be applied on a certain node. Thus, a user and/or the system (e.g., automatically) may quickly check what direction of research may be most promising. Using the patterns may allow creation of an alphabet of patterns operating as a suitcase of research tools. For example, a pattern may include "(1) Segmentation by dimension values, and then (2) a Compare operation".

The studio module 128 may include, for example, a development environment (e.g., a graphical development environment) to define, maintain, modify and/or customize the operation of analyzer 120 and/or components of analyzer 120. For example, the studio module 128 may modify or customize the searching patterns or definitions (e.g., priority definitions) used by the proactor module 125; the studio module 128 may modify or customize a collection scheme, or create or define a new collection scheme, used by the collector module 121 and/or by components (e.g., collection agents 151-155) associated with data collection; and the studio module 128 may be used to maintain or view one or more assurance modules used by analyzer 120. In one embodiment, the studio module 128 may use "wizards" or "by-example" definition processes, thereby supporting or providing an interactive environment to allow an easy definition or fine-tuning of components, modules or objects used by the analyzer 120. In one embodiment, the studio module 128 may define raw data structure, CIR structure and/or monitored components.

The dashboard module 129 may include, for example, a tool for customization of customer-specific presentations, e.g., to provide end-to-end visibility into customer experiences at targeted customer population groups. For example, in one embodiment, a first department of an organization (e.g., operations department) may use the dashboard module 129 to create a customized view of the experiences of a first segment or type of customers (e.g., preferred customers or "VIP" customers), whereas a second department of the organization (e.g., marketing department) may use the dashboard module 129 to create a customized view of the experiences of a second segment or type of customers (e.g., customers of a newly-offered service).

The analyzer 120 may include other modules or components, e.g., to achieve additional or other functionalities. In some embodiments, for example, the analyzer 120 may optionally be implemented using a flexible, modular, nested and/or open-ended framework 171, e.g., to allow rapid introduction of new functionalities or features, or to allow flexible extension of functionalities to create tailor-made analysis.

In some embodiments, optionally, framework 171 and/or analyzer 170 may include, or may be associated with, one or more models and algorithms 172, for example, an adaptive domain-specific model to transform raw operational data into service experience insights; a model to create a holistic view into customers' experiences; one or more plug-in components that extend the operation of framework 171 and/or analyzer 170 (e.g., to support connectivity with network components, customer care systems, Customer Experience Measurement (CES) systems, Network Management Systems (NMS), or the like); pre-defined building blocks of common services in a certain field, and abstraction of services' components; and other suitable models and algorithms.

Output produced by the analyzer 120 (e.g., by the proactor module 125) may be transferred to, or used by, one or more output consumers 160. For example, output consumers 160 may include a Network Management System (NMS) 161, a Customer Experience Measurement (CEM) system 162, a Manager of Managers (MoM) system 163, a Service Level Management (SLM) system 164, or other output consumers.

In one embodiment, for example, the NMS 161 may receive output produced by analyzer 120 (e.g., output indicating low or negative experiences in a certain service), and may examine the underlying technical infrastructure to resolve the problem that system 100 has detected.

The CEM system 162 may receive inputs from system 100, which may allow the CEM system 162 to better target its pre-configured scripts from handsets simulators on areas in which customer's experience is negative or "bad". Thus, system 100 may be used as a focusing mechanism for the CEM system 162. Furthermore, raw data from synthetic transactions generated by CEM scripts may be used in conjunction with the system's other raw data, e.g., to obtain a complete or representation of system behavior. In some embodiments, for example, the CEM system 162 may generate raw data for system behavior that has no informational footprint, e.g., based on real customer actions and transactions.

The MoM system 163 may receive alerts and/or information from system 100, and use them as part of its single unified dashboard view.

The SLM system 164 may use inputs from system 100 on a service experience level to track services' performance (e.g., using KPIs and KQIs), and may generate an alert if the service performance breaches a service level agreement.

In some embodiments, for example, a customer care professional may use the analyzer 120 to obtain an end-to-end view about the experience of a certain user of a service. The analyzer 120 may assist the customer care professional to elicit or better elicit customers' complaints, thereby assuring that engineering and/or operation support personnel have sufficient data to reconstruct and solve problems. Furthermore, customer care professionals may consult the problets repository 127 to identify a known problem, or may use the troubleshooter module 126 to get a current end-to-end view on a specific customer state and experiences.

In some embodiments, for example, an operations professional may use the analyzer 120 to detect and resolve problems in services under his supervision, which may result in negative customer experiences. The analyzer 120 may assist the operations professional to prioritize and handle services in a granularity of a single customer experience.

In some embodiments, for example, an engineering professional may use the analyzer 120 to fix, correct and resolve functional and/or logical problems, e.g., problems which may not be resolved by an operations professional. The analyzer 120 may allow the engineering professional to proactively monitor services during run time (e.g., substantially in real time), thereby allowing a fast (or relatively faster) introduction of services, and optionally eliminating the need for a complete lab testing session.

In some embodiments, for example, a marketing professional may use the analyzer 120 to obtain insight into customers' experiences while using services, thereby allowing generation of conclusions with regard to adoption rates, and parameters (e.g., planned versus actual) of service implementation qualities. Furthermore, using the online and proactive monitoring of customer experiences, the marketing professional may intervene during run time (e.g., substantially in real time), for example, to detect a user having a negative experience and to offer upgrades, promotions, or mitigation offers.

In some embodiments, information produced by analyzer 120 may be transferred to an Operational Support System/Operations Service and Support System (OSS), or to a Billing Support System/Business Support System (BSS), for example, to augment the view which they offer on certain services.

In some embodiments, system 100 and/or analyzer 120 may operate within, or may be associated with, a "problem domain", for example, an environment or ecology of entities and/or transaction, e.g., banking, finance, telecommunications, wireless communications, wired communications, online transactions, Internet-related transactions, pharmaceuticals, or the like.

In some embodiments, the problem domain may be related to one or more "domain entities", which may include, for example, systems, sub-systems, applications and/or components which may be supervised or monitored, e.g., as a main focus of an investigation or as a partial focus of an investigation.

In some embodiments, a system or components under investigation may have a "context", for example, an abstract boundary definition which may define one or more domain entities (e.g., or properties or characteristics of domain entities) which may be monitored or investigated using system 100 and/or analyzer 120. Context definitions may segment components and services into manageable areas, and may support hierarchies (e.g., such that a first context may be constructed based on a second context).

In some embodiments, optionally, analyzer 120 may generate and/or utilize indicators, for example, a Key Performance Indicator (KPI) and/or a Key Quality Indicator (KQI). In one embodiment, a KPI may include a pre-defined formula that gauges a component's performance, e.g., based on quantitative facets of that component. For example, a KPI for a server may include its average up-time, namely, the ratio between the time periods in which the server is functioning to the total elapsed time since the beginning of measurement. In one embodiment, a KQI may map the technical "health" (or performance) of a component to the quality of the service which is implemented on top of it. In some embodiments, KQIs and KPIs may be defined in hierarchies, thereby creating complex structures (e.g., a complex KQI built from KQIs, or a complex KQI built from KQIs) and reflecting quality dependencies between components that may operate together. In one embodiment, the KQIs and KPIs may be generated dynamically.

In some embodiments, the CIR repository 124 may be a general informational asset of the organization, e.g., a data warehouse. The system 100 may generate other knowledge on the monitored system or service. Optionally, a user may inject or insert problets that represent an interest that the user may have about the monitored system or service, utilizing the continuous search of the proactor module 125. For example, a user may inject or insert a problet that defines "alert when the ration of premium users accessing a service is higher than a certain threshold". Accordingly, the system 100 may be used for definition of indicators which are not necessarily technical or negative.

Figure 2:
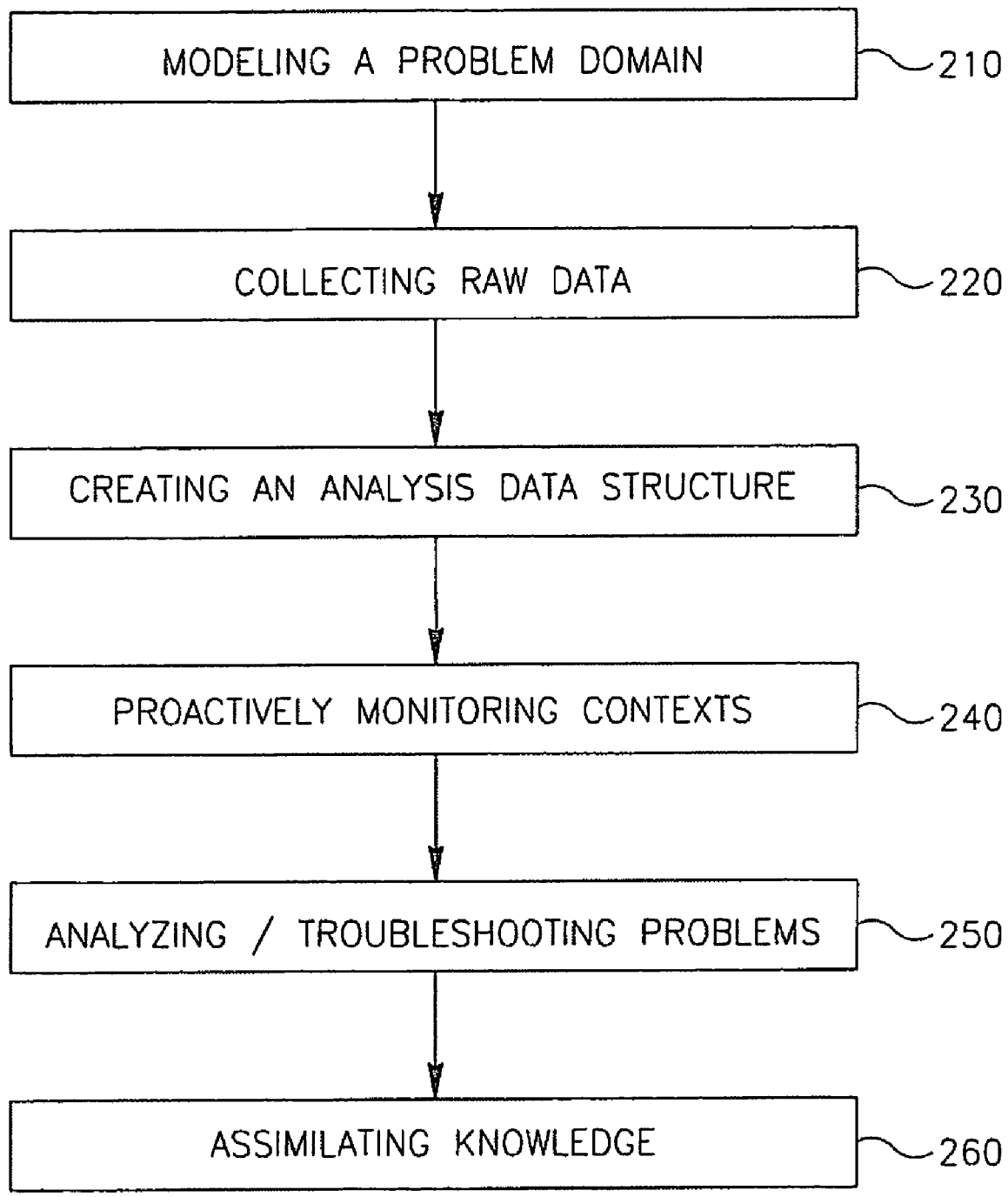
FIG. 2 is a flow-chart diagram of a method of monitoring in accordance with some embodiments of the invention.

FIG. 2 is a flow-chart diagram of a method of monitoring in accordance with some embodiments of the invention. The method may be used, for example, in conjunction with the system 100 of FIG. 1, the analyzer 120 of FIG. 1, and/or other suitable systems and devices.

As indicated at box 210, the method may include, for example, modeling a problem domain (e.g., using the studio module 128 of FIG. 1). This may include, for example, defining an "informational footprint" of one or more domain entities, e.g., data generated by a domain entity using one or more types of electronic signatures. The informational footprint may include, for example, data in error files or error logs, data in audit files and audit logs, data in history files or history logs, other history data or "recent activity" data, databases or data which may be included in other monitoring applications, databases or data which may be included with other applications which communicate with the domain entity, data in network, application or handset resident probes, or the like.

In some embodiments, the modeling may include, for example, defining a data model which able to contain the informational footprint. In one embodiment, optionally, modeling may not include obtaining or defining state information about a domain entity.

In some embodiments, the defined model may be shared and/or used, for example, by one or more modules or algorithms (e.g., of the analyzer 120 of FIG. 1). Optionally, the domain model may be segmented into one or more contexts. For example, a context in the field of mobile telecommunications may include "Person to Person Multimedia Messaging Service (MMS)", which may be constructed from two sub-contexts, namely, "MMS Send" and "MMS Receive".

As indicated at box 220, the method may include, for example, collecting raw data (e.g., using collector module 121 of FIG. 1). For example, informational fingerprints of domain entities may be collected by a distributed network of collection agents. Optionally, each collection agent may collect information from a certain entity. In some embodiments, a collection agent may reside on the same machine (e.g., computing platform or sub-system) as the collected entity, or in another (e.g., remote) location. The collected raw data may be stored in a central raw data repository (e.g., raw data repository 122 of FIG. 1).

As indicated at box 230, the method may include, for example, creating an analysis data structure (e.g., using the builder 123 of FIG. 1). This may include for example, aggregating information (e.g., from the disparate data entities) into a unified data structure, for example, CIR. The created CIR may unify substantially all information required to gain an end-to-end view and understanding of the context under investigation.

In some embodiments, CIRs may be correlated with an atomic usage transaction of the context. In one embodiment, for example, whenever a context is used, a CIR data structure may be generated for it. For example, a context may be "sending a letter" (e.g., associated with domain entities of "envelope", "stamp" and "letter"), and whenever a user sends a letter, a new CIR will be generated for each letter sent.

In some embodiments, CIRs may be hierarchical. For example, a first CIR may be constructed from one or more other CIRs, optionally aggregating their data, thereby allowing easy modeling of complex hierarchical services and systems. For example, a "Mail Usage" CIR may be constructed from several sub-CIRs, e.g., "send letter", "dispatch letter", "receive letter".

As indicated at box 240, the method may include, for example, proactively monitoring one or more contexts (e.g., by the proactor module 125 of FIG. 1). This may include, for example, scanning and/or analyzing CIRs of contexts, e.g., on an ongoing basis, continuously, periodically, in real time, substantially in real time, on demand, in response to a triggering event or condition, or the like. The proactive monitoring may further include, for example, utilizing data mining and/or knowledge extraction algorithms, and/or identifying functional and logical anomalies. In one embodiment, if a problem was identified in the past, the monitoring system may check for its re-occurrence. In some embodiments, once a problem is identified, an alert may be generated.

As indicated at box 250, the method may include, for example, analyzing and/or troubleshooting identified problems or alerted problems (e.g., using the troubleshooter module 126 of FIG. 1). For example, when problems are identified and alerted, a user may inspect the problem information using an investigation and resolution environment. The troubleshooting environment or module may allow the user, for example, to examine suspected CIRs from different perspectives, and to utilize automatic investigation tools for resolution.

In one embodiment, the research process may be defined as movement on a graph, wherein each node may be a combination of a data set and an analytical view. For detection of the problem, the researcher may need to view the correct (e.g., true and/or relevant) data using the correct (e.g., appropriate and/or relevant) analytical tool. The troubleshooter module may support this process by providing users various tools to define and analyze populations along a structured path, optionally using search tools which may help the user gain the correct analytical perspectives. The troubleshooting may further help the user gain a global perspective, e.g., by recommending to the user new starting points for his investigation.

As indicated at box 260, the method may include, for example, assimilating knowledge within the monitoring system. The knowledge assimilation may include, for example, extension of the knowledge base, e.g., based on previously-conducted investigations.

Knowledge assimilation may include, for example, creating problets (e.g., by the proactor module 125 and/or the troubleshooter module 126 of FIG. 1) and storing problets (e.g., into the problets repository 127 of FIG. 1). Problets may include abstract representations of problems in a way or format that allows identification of similar problems exhibiting the same (e.g., substantially identical, or similar) behavior or effects. Problets may transform or convert a discovered problem from the realm of non-defined problem to the realm of previously known problems. A problet may be more easily scanned for re-occurrence, and the problet may convey the history of occurrence of a problem and/or its anomaly strength. Problets may be used to detect evolving and decreasing problems, e.g., by tracking the anomaly strength along time. Problets may optionally include, for example, supportive information (e.g., resolution procedures). In some embodiments, stored problets may be used for rapid resolution of identical or similar problems or anomalies, e.g., in case of re-occurrence. In some embodiments, knowledge may be injected or imported, e.g., to shorten the circle of knowledge gain; optionally, knowledge injection or importation may be verified for relevance.

In one embodiment, knowledge assimilation may further include, for example, updating, upgrading, adapting and/or evolving the underlying data model, e.g., through or based on user investigations.

Figure 3:
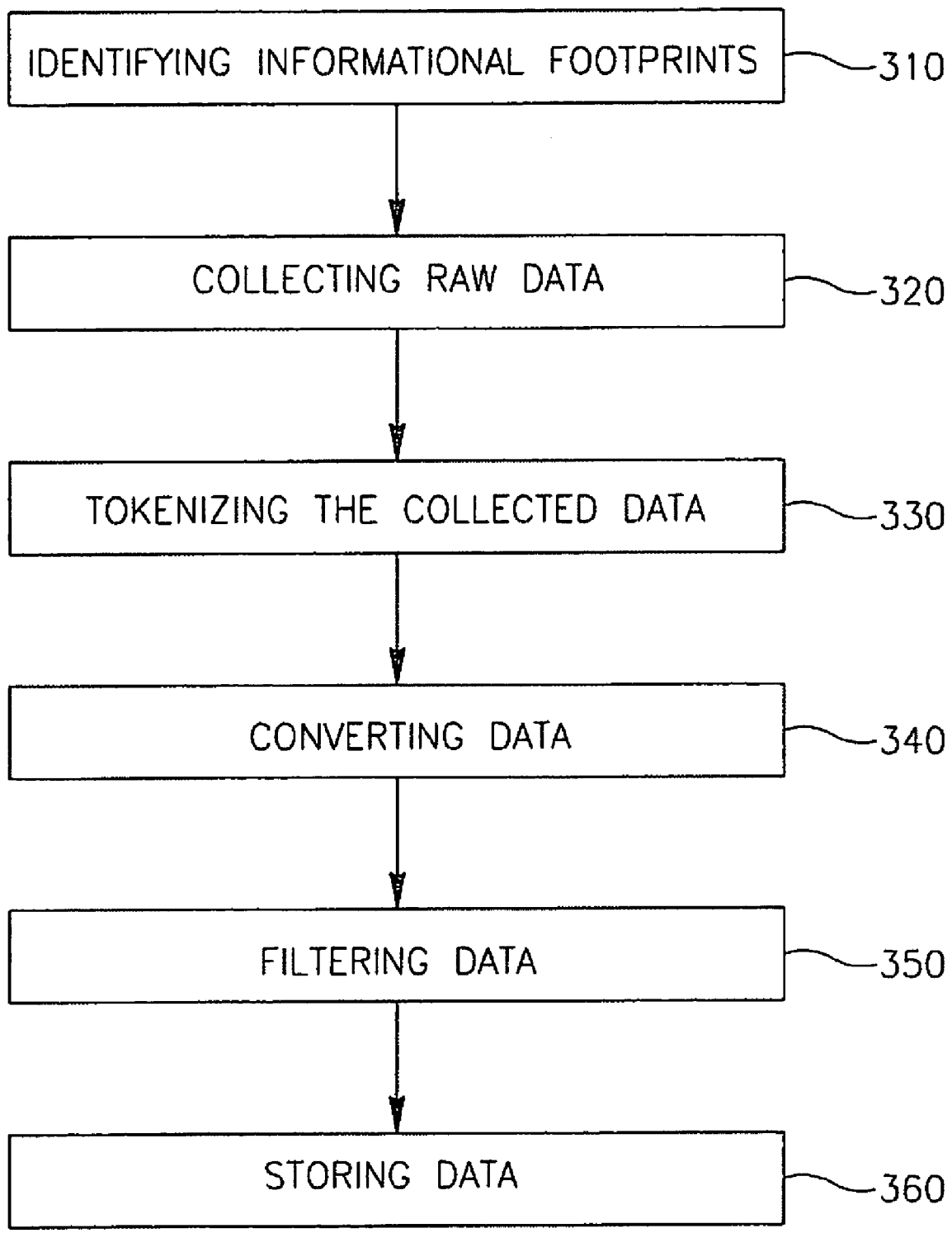
FIG. 3 is a flow-chart diagram of a method of data collection in accordance with some embodiments of the invention.

FIG. 3 is a flow-chart diagram of a method of data collection in accordance with some embodiments of the invention. The method may be used, for example, in conjunction with the system 100 of FIG. 1, the analyzer 120 of FIG. 1, and/or other suitable systems and devices.

As indicated at box 310, the method may include, for example, identifying electronic footprints or informational footprints of system components, e.g., using log files, audit files, history files, history data, databases, or other information sources.

As indicated at box 320, the method may include, for example, collecting the raw data representing the informational footprints.

As indicated at box 330, the method may include, for example, tokenizing the collected data. For example, collected data may be processed and mapped such that substantially each data item may be accessible using a model of its respective input source. In one embodiment, for example, a data item having a file may be mapped into lines and/or words.

As indicated at box 340, the method may optionally include, for example, converting data in accordance with one or more pre-defined rules. This may include, for example, normalizing data, formatting or re-formatting data, adapting data, or otherwise transforming data, e.g., to meet system requirements (e.g., a "native dialect" format of the monitoring system).

As indicated at box 350, the method may include, for example, filtering data. For example, data filters may be defined to prevent data from further tunneling along an information chain. One embodiment, for example, may define that remarks or comments that are marked by a special prefix and/or suffix may be discarded, or may not be further processed or investigated.

As indicated at box 360, the method may include, for example, storing the data (e.g., in the raw data repository 122 of FIG. 1). Optionally, substantially each data source may be mapped to one or more data components which store the data and its meta-attributes.

Figure 4:
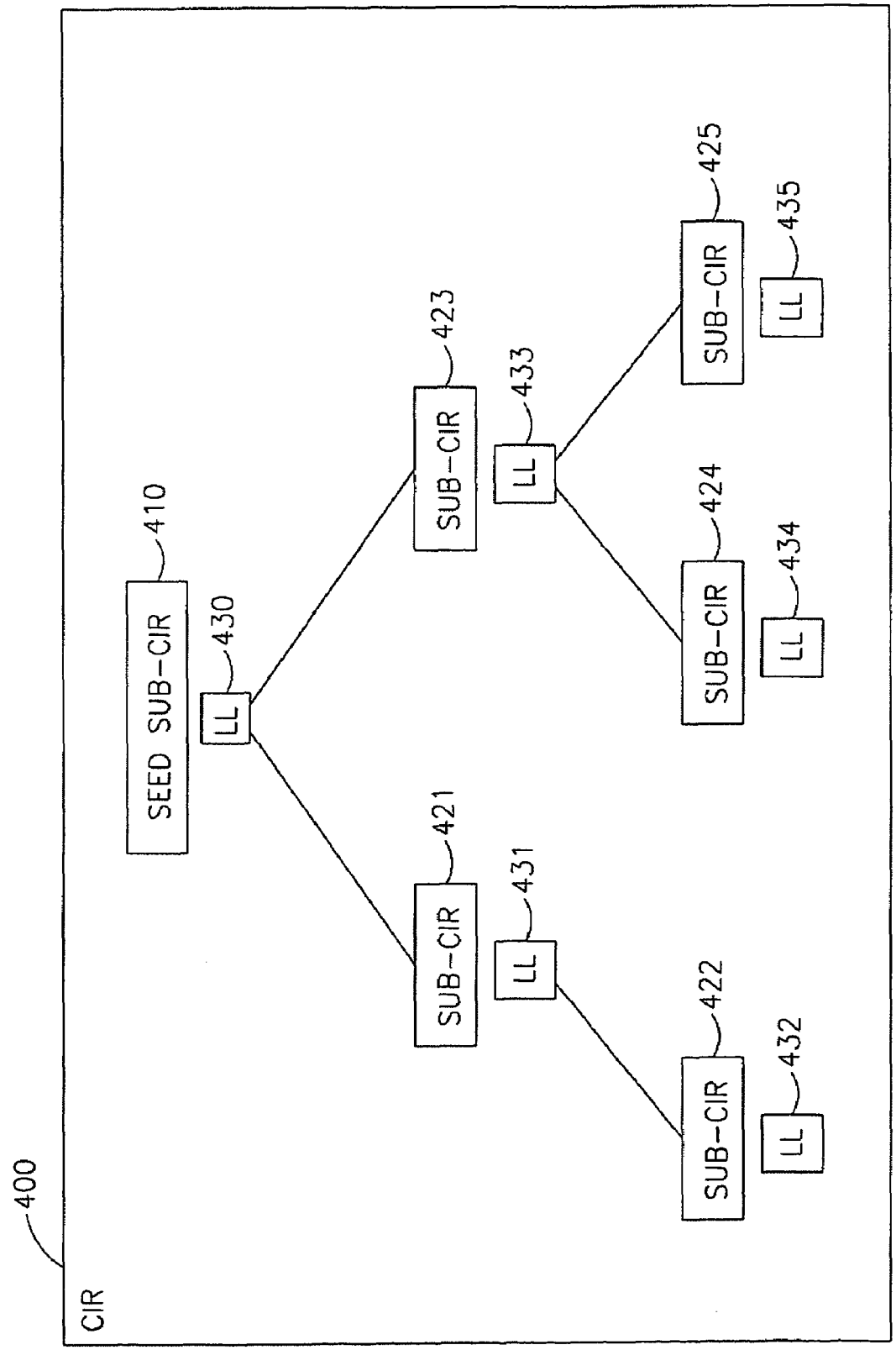
FIG. 4 is a schematic block-diagram illustration of a Context Insight Record (CIR) in accordance with some embodiments of die invention.

FIG. 4 is a schematic block-diagram illustration of a CIR 400 in accordance with some embodiments of the invention. CIR 400 may optionally include multiple sub-CIRs, for example, a seed sub-CIR 410 and sub-CIRs 421-425.

In some embodiments, CIRs may be constructed from raw data (e.g., stored in the raw data repository 122 of FIG. 1). One embodiment may differentiate between an input CIR and an output CIR, such that, for example, one or more input CIRs may be aggregated into an output CIR. For example, an output CIR may have a one-to-many relationship with one or more input CIRs.

In some embodiments, the structure of CIR 400 may reflect hierarchies of various depths, for example, such that an output CIR may be further aggregated into another output CIR (e.g., the first output CIR may be used as an input CIR if it is not the higher level output CIR). A root node of the CIR 400 hierarchy may be referred to as a seed CIR or seed sub-CIR 410. Once a data component is linked, its mirror image may be being copied, transferred, or otherwise "injected" into the CIR as a sub-CIR. Therefore, CIR 400 may include a hierarchy of sub-CIRs 421-425 which may be interlinked. The sub-CIRs of CIR 400 may optionally be interlinked, for example, using Linkage/Level (LL) information indicators which may be associated with each sub-CIR, for example, LL indicators 430-435. In one embodiment, the original data components may be saved (e.g., substantially "untouched") in the database.

In one embodiment, in addition to raw data and linkage information, the CIR 400 may further include insight information, for example, "segments", "behaviors", "experiences", or other insight information as described herein.

In some embodiments, CIRs may be significant data components and may act operate as a main information channel between components. CIRs may aggregate information from different sources and may provide a focal point with an endto-end view into a business process and services state. For example, the proactor module 125 of FIG. 1 may process CIRs for anomaly detection, and the troubleshooter module 126 of FIG. 1 may allow research and analysis of different groups of CIRs populations.

Figure 5:
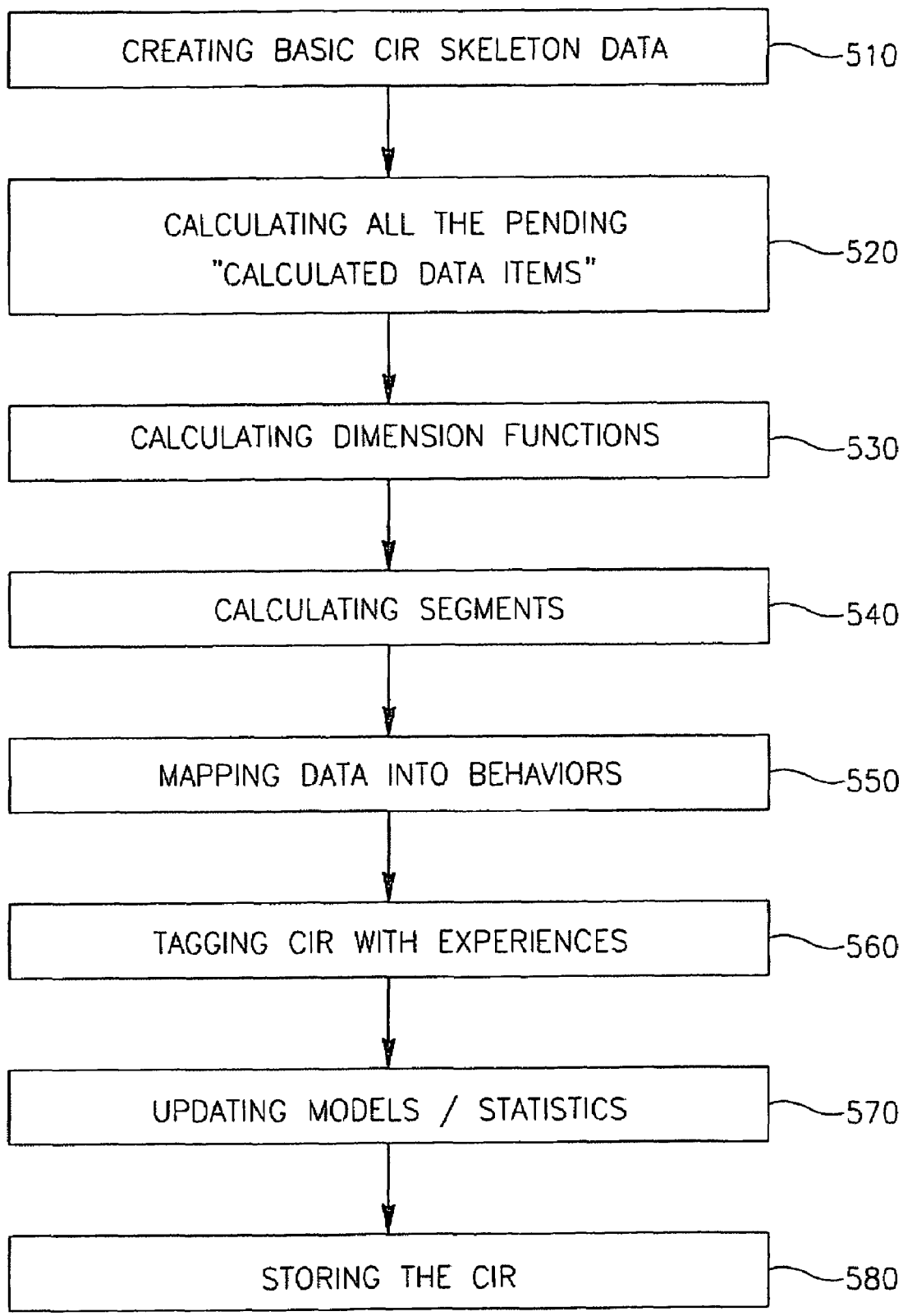
FIG. 5 is a flow-chart diagram of a method of creating a CIR in accordance with some embodiments of the invention.

FIG. 5 is a flow-chart diagram of a method of creating a CIR in accordance with some embodiments of the invention. The method may be used, for example, in conjunction with the system 100 of FIG. 1, the analyzer 120 of FIG. 1, and/or other suitable systems and devices.

Figure 6:
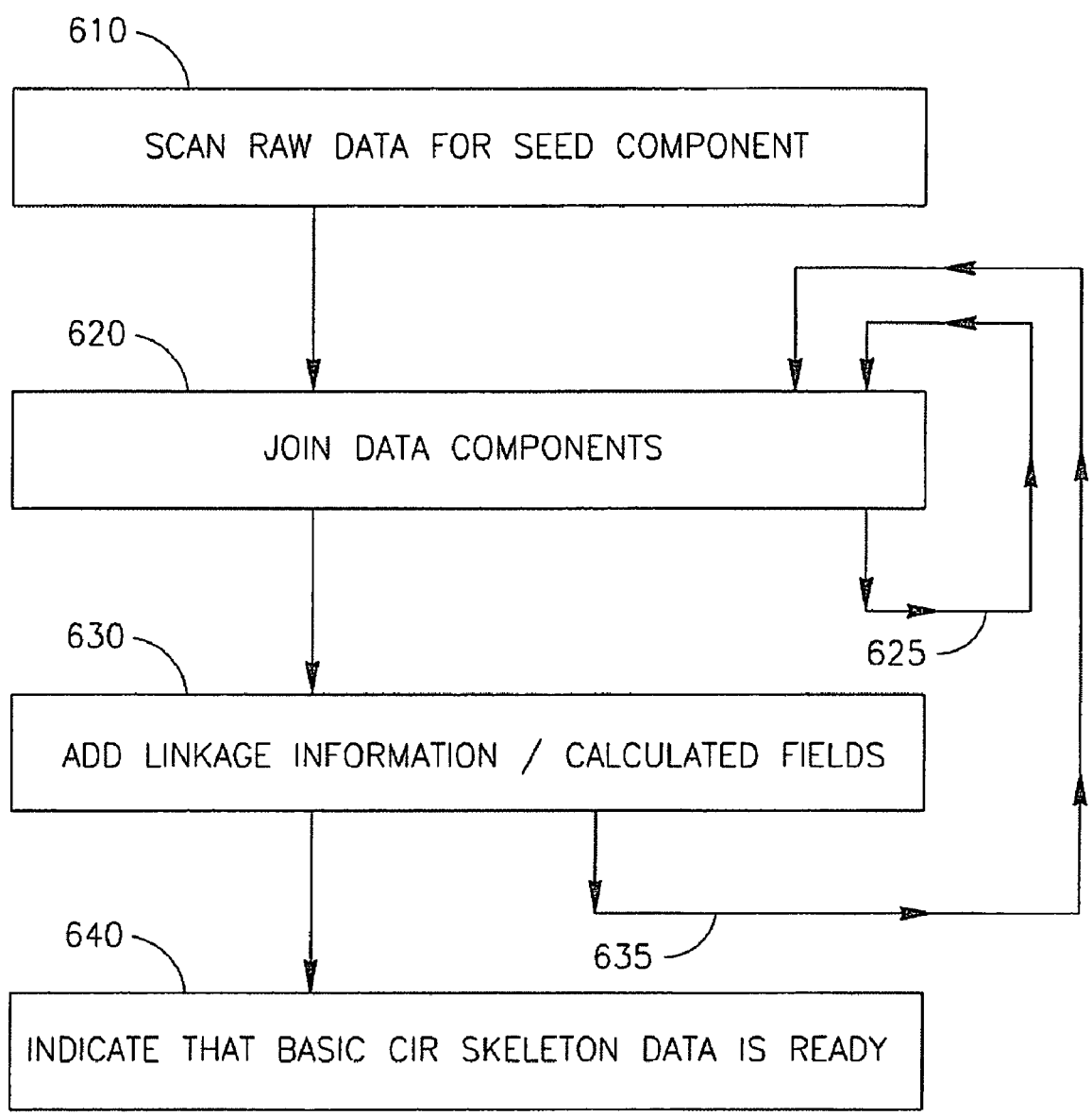
FIG. 6 is a flow-chart diagram of a method of creating basic CIR skeleton data in accordance with some embodiments of the invention.

As indicated at box 510, the method may include, for example, creating basic CIR skeleton data from correlated data (e.g., using the method of FIG. 6 or other suitable methods).

As indicated at box 520, the method may include, for example, determining or calculating substantially all the pending calculated data items. In one embodiment, a "calculated data item" may not be part of the original, raw data, but rather may be based on one or more existing data items or other calculated data items.

As indicated at box 530, the method may include, for example, determining or calculating substantially all dimension functions. For example, an input CIR which is aggregated into an output CIR, may induce summary dimensions in the output CIR.

As indicated at box 540, the method may include, for example, calculating segments. This may include, for example, mapping from raw data into a pre-defined range of tokens. Segments may ease the readability of CIRs and/or may allow abstraction of data. For example, a range of numbers may be divided into three segments: "low", "medium" and "high". In one embodiment, segments may not provide judgmental indicators but rather informative indicators.

As indicated at box 550, the method may include, for example, mapping data into one or more behaviors, which may be added into the CIRs (e.g., as "tags").

As indicated at box 560, the method may include, for example, tagging the CIR with experiences. This may include, for example, applying an experience machine, an experience-estimating algorithm, an experience-grading algorithm, or an experience-evaluating algorithm; and/or calculating for each CIR the visible experiences that a user experienced based on the CIR experiences and behaviors and existing data.

As indicated at box 570, the method may include, for example, updating models and/or statistics. For example, co-occurrence of behaviors or experiences may optionally be saved or stored in dependency models to reflect the causality between behaviors and experiences.

As indicated at box 580, the method may include, for example, storing the prepared CIR into a CIR repository, e.g., by copying, transferring, inserting, or otherwise "injecting" the CIR into the CIR repository.

In one embodiment, a CIR may have one of several states indicating how mature the CIR is for processing and analysis by the monitoring system. The CIR preparation process may define when (or, at what stage) a CIR may be deemed ready for further processing.

FIG. 6 is a flow-chart diagram of a method of creating basic CIR skeleton data in accordance with some embodiments of the invention. The method may be used, for example, in conjunction with the system 100 of FIG. 1, the analyzer 120 of FIG. 1, and/or other suitable systems and devices.

As indicated at box 610, the method may include, for example, scanning a raw data repository for seed data components. For example, a seed data component may be selected and used as a seed CIR.

As indicated at box 620, the method may include, for example, joining (or attempting to join) other data components to the seed CIR, e.g., based on pre defined linkage rules. The linkage rules may indicate, for example, conditions under which a first data component may be linked to a second data component, transformation the data component, or other rules. In one embodiment, once all eligible data components are linked into the seed CIR, each of them may be defined as a seed CIR and the process may repeat (e.g., recursively) until no additional data components may be linked into the CIR.

As indicated at box 630, the method may optionally include, for example, adding linkage information. For example, when two data components are joined, the system may enrich their respective sub-CIRs with linkage information that may include the rational for linkage and/or calculated fields that reflect the nature and characteristics of the linkage. In one embodiment, when a data component is linked into a CIR, the data component may be subject to modifications, e.g., removal or addition of information, data transformation or conversion, re-formatting, or the like. In some embodiments, the same raw data may be used in more than one type of CIRs, for example, as the same component may take part in, or be associated with, more than one process or system that are being monitored.

As indicated by arrows 625 and 635, one or more of the operations of the method may be repeated, e.g., for a certain number of iterations or until a pre-defined condition is met.

As indicated at box 640, the method may include, for example, indicating that the basic CIR skeleton data is ready for further processing and data storage.

Figure 7:
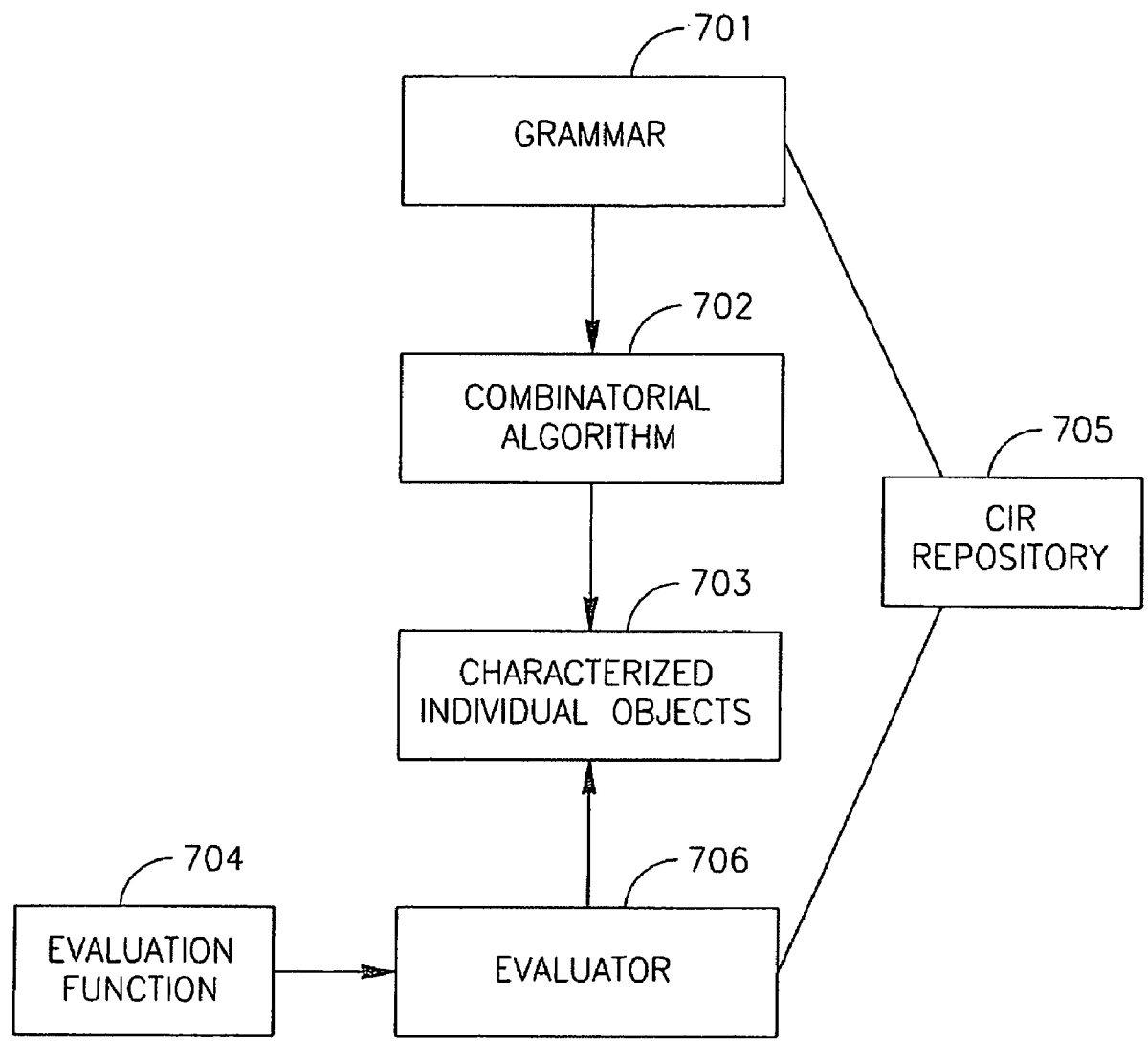
FIG. 7 is a schematic block-diagram illustration of interaction between components and characterization in accordance with some embodiments of the invention.

FIG. 7 is a schematic block-diagram illustration of interaction between components and characterization in accordance with some embodiments of the invention. For example, analyzer 120 may include or use an anomaly finder algorithm, which may be an implementation of a larger scale algorithm for characterizing different populations of objects.

In a certain domain, components information may be gathered and aggregated into CIRs, and then stored in a CIR repository 705. A process may scan the CIR repository 705 and may create a grammar 701 (e.g., an alphabetical list, an index, a table of contents, a set of pointers, a lookup table, a matrix, a semantic network, or the like) of the contained CIRs. In one embodiment, any individual CIR may be represented using the grammar 701. Furthermore, the grammar 701 may be used for constructing both the existing CIRs as well as potential CIRs which are not actually contained in the repository.

Using the grammar 701, a combinatorial algorithm 702 (e.g., a combinatorial search engine or scanning engine) may construct one or more new individual objects 703 (e.g., characterized objects), which may be evaluated by an evaluator 706 according to an evaluation function 704. The attributes and nature of the characterized individual objects 703, as well as the evaluation function 704, may be open ended.

In some embodiments, the anomaly finder algorithm may build population of CIRs as characterized individual objects 703, using an evaluation function 704 that measures the extent of an anomaly in the CIR population. Both the population characteristics and the type of anomaly may be part of the attributes of the characterized individual objects 703.

In some embodiments, the anomaly finder algorithm may scan a large search space for KPIs/KQIs that may be able to detect current anomalies in a system. The algorithm may evolve new KPIs/KQIs based on a current system state. The KPIs/KQIs may be dynamically generated and need not be pre-defined, and thus may be suited to reflect the current state of the system. Furthermore, the granularity and complexity of the generated KQIs/KPIs may be high, thereby allowing measurement of finely characterized populations.

Some embodiments may utilize a Genetic Algorithm (GA) or a genetic-like algorithm, and/or other algorithms which may be suitable for searching large search spaces, for example, genetic programming, evolutionary strategies, stochastic hill-climbing, Tabu Search, or the like. Such search spaces may include, for example, search spaces of NP-hard or NP-complete problems, which may not be searched using exhaustive search techniques.

In some embodiments, each CIR may include data items (e.g., plain data collected from components footprints) and dimensions. A dimension may include a function of a data item (or, in one embodiment, the data item itself), and may allow segmentation of a population to several sub-populations. For example, "handset type" may be a dimension in the field of mobile telecommunications, as it allows differentiating between populations or sub-populations based on their handset type.

In some embodiments, dimensions may be used as statistical clues for a problem with a certain component. For example, when a MMS message is sent, the receiver may try to fetch the message several times via a Wireless Application Protocol (WAP) interface. A dimension may be defined as the aggregation of all the retries to fetch a message, e.g., for a certain message. In one embodiment, the higher the value of this dimension, the higher the probability that a problem exists with regard to the transaction.

Some embodiments may include multiple types of dimensions, for example, behaviors and experiences. A behavior may be an abstraction that critically describes data in expert-like language, for example, "Session Disconnected", "Data Error Format", or the like. Behaviors may be based on information available on the CIR level, and may be embedded within CIRs as dimensions. Behaviors may represent mapping of CIR-level data items into more readable abstraction. Experiences may be high level abstractions that describe a customer's experience using experience semantics, for example, responsiveness, availability, integrity, usability, or the like.

Experiences and/or behaviors may be hierarchical constructs, such that they can be calculated using sub-experiences and sub-behaviors. For example, the "availability" experience of a service may be calculated from the "availability" experiences of its sub-components; and the later may be calculated from the relevant behaviors of the CIRs of those components. For example, the "Availability" experience may be calculated based on the "Session Disconnected" behavior.

In some embodiments, the semantics of experiences may be integrated with the analysis algorithms, e.g., to search for anomalies in populations that suffer from a certain experience. For example, the proactor module 125 of FIG. 1 may detect that users of a certain service, that utilize specific equipment, suffer from low level of service "Availability".

In some embodiments, experiences may be calculated using means other than mapping. For example, pattern recognition methods may be used to detect change in the usage patterns of users, thereby reflecting a change in their experiences. For example, the system may detect a pattern in which for each "MMS Send" operation there exists a "MMS Retrieve" operation; therefore, when a user submits several consecutive "MMS Retrieve" operations following a single "MMS Send" operation, a problem with the retrieving operation may be detected.

In some embodiments, the anomaly finder algorithm may be implemented using a GA. For example, a "gene" (used in chromosome coding) may correspond to, or represent, a "dimension". Each "chromosome" of a GA may represent a candidate solution to the problem at hand. In one embodiment implementing the GA, each "chromosome" may represent a possible anomaly in a context using the coding of multiple types of dimensions, for example, criteria dimensions, segmenting dimensions, and testing dimensions.

In some embodiments, criteria dimensions may represent the characteristic of a certain population. For example, the "chromosome" may represent any type of population possible, and its semantic power may be limited only by the strength of the dimension definitions.

In some embodiments, a segmenting dimension may divide (or group) the population into several sub-populations; for example, one or more of these sub-populations may be hypothesized to have an anomaly. In some embodiments, a testing dimension may include criteria by which the different sub-populations of the segmenting dimensions may be tested.

In one embodiment having a population, the segmenting dimension may be "Handset Type" with possible values of "Motorola", "Nokia" and "Sony", whereas the testing dimension may be "Success Code" with possible values of "OK" and "Failed". Table 1 may represent an anomaly testing function in accordance with some embodiments of the invention; other suitable testing functions may be used.

TABLE 1

|        | Motorola | Nokia | Sony |
|--------|----------|-------|------|
| OK     | 88%      | 86%   | 4%   |
| Failed | 12%      | 14%   | 96%  |

Each cell in Table 1 may indicate the percentage, out of the total testing dimension population, that each segmenting dimension represents. For example, as shown in Table 1, out of the total transactions using Motorola handsets, 88 percent of such transactions succeeded. However, as shown in Table 1, Sony handsets show a low level of success rate (4 percent) and a high level of failure rate (96 percent) comparable to the other sub-populations of the segmenting dimension. Therefore, the "Handset Type" dimension may allows dividing the general population to sub-populations based on the handset type used, and provides a clue that there is a problem with a certain handset type.

In some embodiments, each "chromosome" may represent a certain combination of population characteristics defined by one or more criteria dimensions, one segmenting dimension and one testing dimension.

In some embodiments, the algorithm may maintain an anomaly table which may act as a "memory" of the algorithm. When a new anomaly is detected, it may be inserted into the anomaly table, e.g., subject to the condition that the table does not contain another anomaly which is substantially identical (or very similar) to it. The anomaly table may operate as a "memory" that spans several runs or iterations of the algorithm, thereby allowing search to be conducted along several runs or iterations. Additionally or alternatively, the table may operate as a "Taboo factor" which directs the algorithm to new areas in the search space, as areas having solutions which are already in the table are avoided. Furthermore, the table may be used as a knowledge repository, since after several runs it may contain the current organization's view on existing anomalies.

In one embodiment, the algorithm may be first executed in an implementation for an initial period of time (e.g., 6 hours, 12 hours, 24 hours, 2 days, 3 days, or a configurable duration based on data complexity and visibility needs), detecting multiple (e.g., many) anomalies. Then, a user may tag some anomalies as "known anomalies", for example, known problems, or natural anomalies that may result from specific characteristics of the environment. As such, the table may operate as a baseline for determining which anomalies are considered interesting, new, or worth further attention and investigation.

Figure 8:
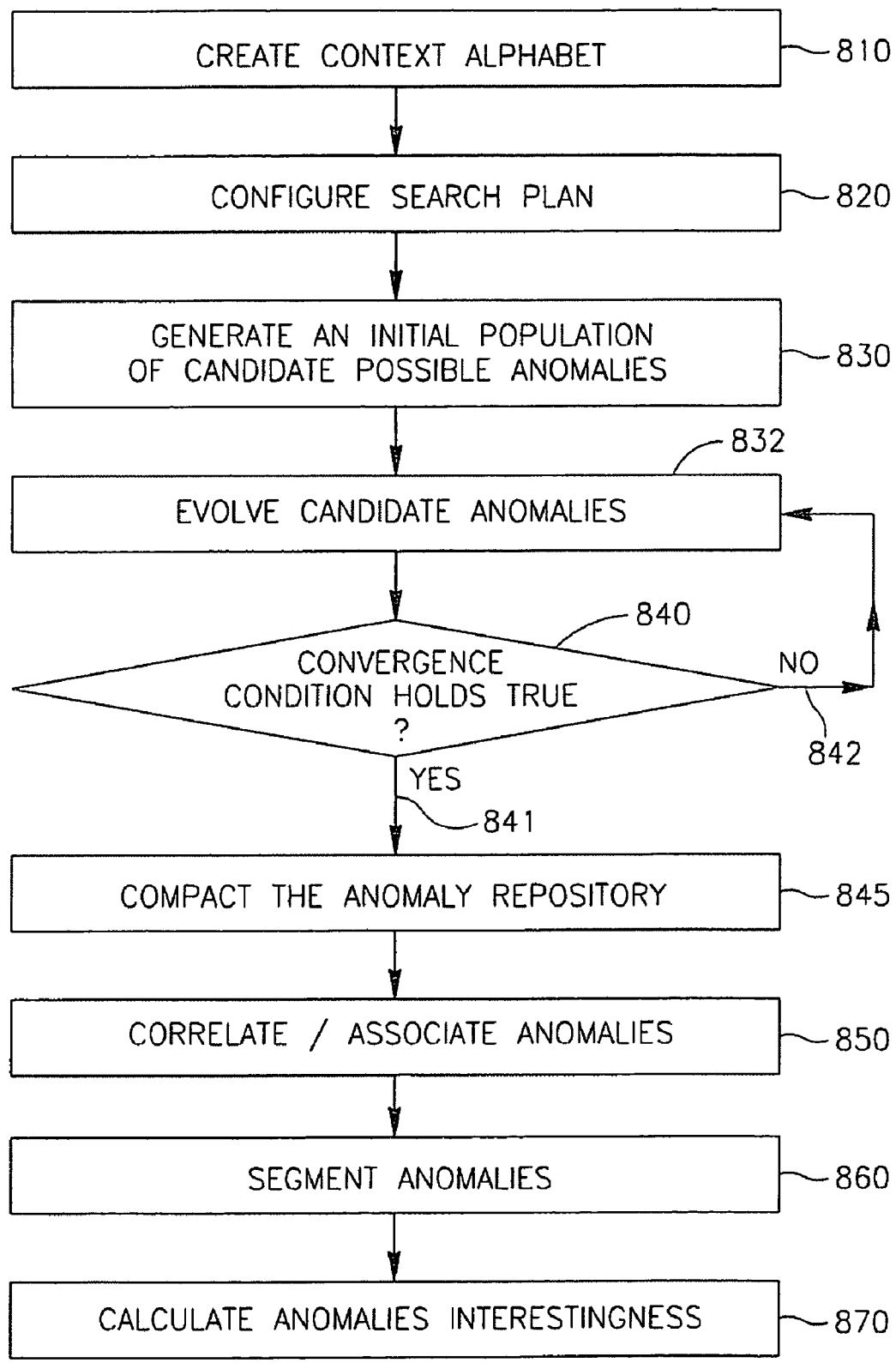
FIG. 8 is a flow-chart diagram of a method of finding anomalies in accordance with some embodiments of the invention.

FIG. 8 is a flow-chart diagram of a method of finding anomalies in accordance with some embodiments of the invention. The method may be used, for example, in conjunction with the system 100 of FIG. 1, the analyzer 120 of FIG. 1, and/or other suitable systems and devices.

As indicated at box 810, the method may include, for example, creating context alphabet. This may include, for example, scanning the CIR repository, and defining or determining possible values for each dimension as part of the alphabet.

As indicated at box 820, the method may include, for example, configuring or establishing a search plan. This may be performed, for example, using an automatic procedure, or manually by a user. In one embodiment, a pre-setting may indicate whether a dimension may be part of the algorithm alphabet. The pre-setting may be, for example, deterministic or based on probabilistic setting where different dimension values may be set using different probabilities. This functionality may be used to focus the algorithm on a certain area, or to single out dimensions which may not be suitable to be a segmenting dimension, a testing dimension or a criteria dimension.

As indicated at box 830, the method may include, for example, generating an initial (e.g., random or pseudo-random) population of candidate possible anomalies. In one embodiment, for example, the generation process may be based on elitism, such that the current best (or good, or relatively better), solutions in the population are saved and automatically moved to the next generation, and/or such that the current worst (or relatively worse) solutions are discarded and not moved to the next generation. Additionally or alternatively, for example, the generation process may be based on rejuvenation, such that new random anomalies may be created to insert new "building blocks" into the population, e.g., by activating new dimensions or dimension values to take part in an anomaly.

In some embodiments, the generation process may include, for example, calculating a fitness function for substantially all candidate solutions, e.g., based on an anomaly test (e.g., as described above with regard to Table 1). For example, a fitness parameter may be calculated, indicating a support level for at least one candidate anomaly in one or more context insight records based on an anomaly test.

In some embodiments, the generation process may include, for example, crossover. For example, two candidate solutions for mating may be selected, e.g., based on their fitness. The selected candidate solutions may be crossed-over, to create two new offspring solutions. Optionally, the created solution may be mutated.

In one embodiment, solutions may be fixed if they do not withstand an exclusion table, e.g., exclusion rules which may indicate which kind of anomalies are considered "valid" or "legal", or heuristic. For example, the exclusion table may indicate that "Country" and "City" may not be used as a test dimension and a segmenting dimension, respectively, due to dependency and/or redundancy.

In one embodiment, the generation process may optionally include, or may be followed by, evaluating candidate anomalies and/or evolving candidate anomalies (e.g., using modification, selection, crossover, mutation, or other operations).

Upon completion of the generation process, the anomaly may be stored or inserted into the anomaly table, if applicable.

In one embodiment, if the new population size is currently below a pre-defined population size or threshold value, then one or more of the above operations (e.g. crossover and solution, mutation, fixing solutions based on the exclusions table or heuristic, and inserting anomalies into the anomalies table) may be repeated.

As indicated at box 832, the method may optionally include, for example, evolving candidate anomalies, e.g., using modification, selection, crossover, mutation, or other operations. For example, a first generation of candidate anomalies may be modified to a second or consecutive generation of candidate anomalies.

As indicated at box 840, the method may include, for example, checking whether a convergence condition holds true. In one embodiment, for example, the convergence condition holds true when a pre-set number of generations elapsed, or when the differences between the best individuals in consecutive generations become relatively small.

As indicated by arrow 841, if the checking result is positive, then the method may cease to produce additional generations of anomalies and may proceed to the operations of box 845 and onward. Conversely, as indicate by arrow 842, if the checking result is negative, then the method may repeat the operations of box 832.

As indicated at box 845, the method may optionally include, for example, compacting the anomaly repository. This may include, for example, fusing together several anomaly candidates that describe the same anomaly in different terms or from different perspectives.

As indicated at box 850, the method may optionally include, for example, correlating (e.g., associating) anomalies and/or performing "fusion" of anomalies. For example, based on structural or semantic similarity, several anomaly candidates (e.g., which represent the same anomaly) may be aggregated into a single anomaly alert. For example, the anomaly "Data problem with Nokia in the North", the anomaly "Data problem with Sony in the North", and the anomaly "Data problem in the North with Nokia" may be fused into a single anomaly "Data problem with Nokia and Sony in the North". Further, several anomalies that result from the same root cause due to ripple effect may be correlated into a single anomaly that represents a representative of the anomaly cluster.

As indicated at box 860, the method may optionally include, for example, segmenting (e.g., grouping, dividing, collecting, aggregating, or the like) anomalies into clusters. For example, a cluster may aggregate several or all anomalies which have a common denominator, property or characteristic, e.g., involved components, involved services, involved customers, or the like.

As indicated at box 870, the method may optionally include, for example, calculating anomalies interestingness. For example, based on customer clues and preferences or heuristic-based analysis, the interestingness of each anomaly to the customer may be calculated. Within each cluster, anomalies may be presented based on their level of interestingness.

In some embodiments, the operations of boxes 810 and 820 may be implemented as pre-processing operations; the operations of boxes 830 and 840 may be implemented as processing operations; and the operations of boxes 845, 850, 860 and 870 may be implemented as post-processing operations.

In some embodiments, the algorithm may be adaptable to changes in service flow, components and their interactions. Once the data model of its informational footprint is supplied, the algorithm may detect anomalies in the component's functional and logical health. In some embodiments, the algorithm may detect previously non-defined problems, e.g., by dynamically creating KPIs/KQIs needed for detecting such problems. In some embodiments, the algorithm may identify problems of populations of various sizes, e.g., from an individual customer up to customers' populations having specific characteristics. The algorithm may be focused to search specific areas of the problem domain, e.g., using clues supplied by a user and/or an internal optimization mechanism for optimal or near-optimal search space coverage, statistical analysis of trouble tickets or services usage patterns. The algorithm may assimilate knowledge and may allow a fast creation of the current organizational view of the problem domain.

Figure 9:
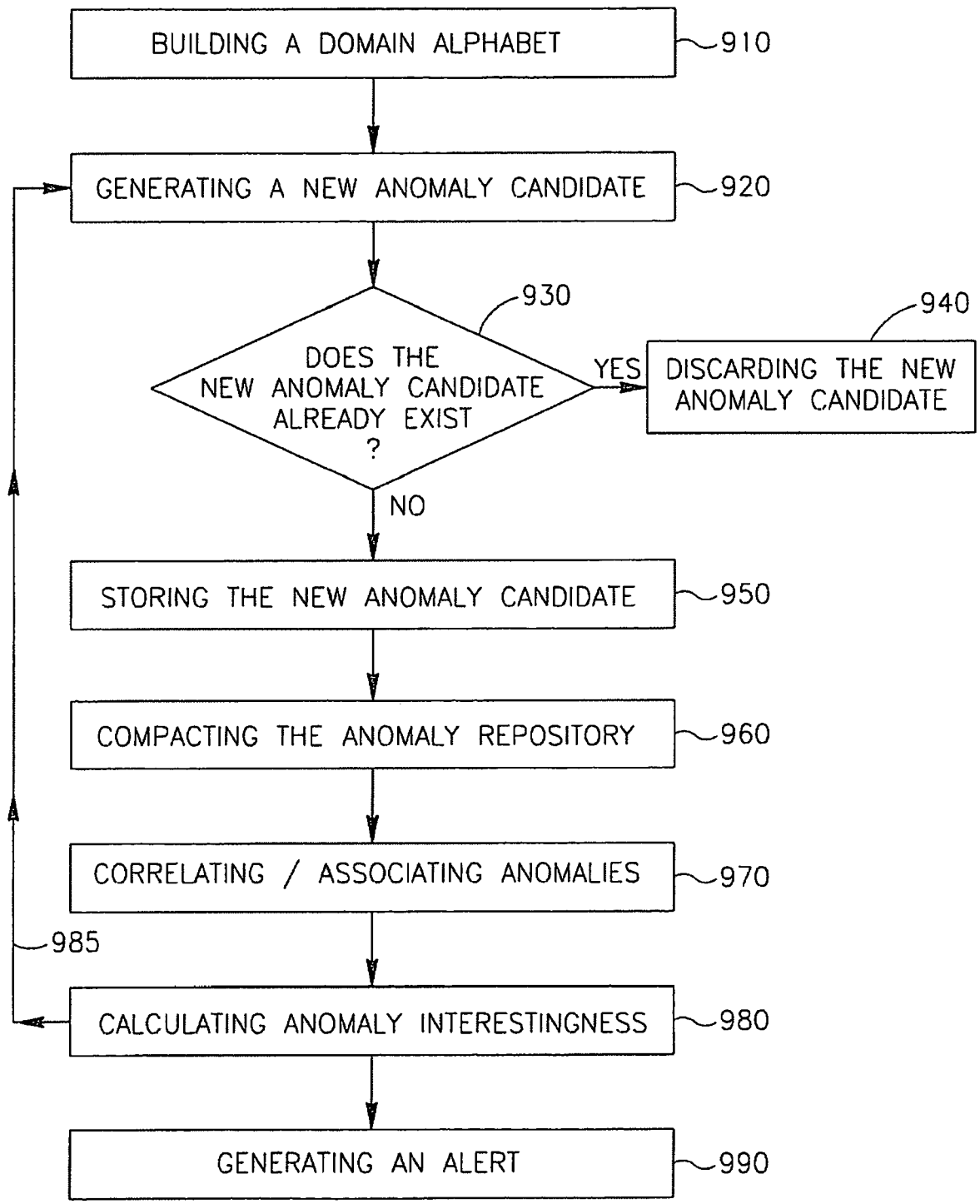
FIG. 9 is a flow-chart diagram of a method of detecting anomalies in accordance with some embodiments of the invention.

FIG. 9 is a flow-chart diagram of a method of detecting anomalies in accordance with some embodiments of the invention. The method may be used, for example, in conjunction with the system 100 of FIG. 1, the analyzer 120 of FIG. 1, and/or other suitable systems and devices. The method of FIG. 9 may be, for example, an implementation of the method of FIG. 8.

As indicated at box 910, the method may include, for example, building a domain alphabet.

As indicated at box 920, the method may include, for example, generating a new anomaly candidate.

As indicated at box 930, the method may include, for example, checking whether the new anomaly candidate does not already exists, e.g., by searching a repository or an anomaly repository or by evaluating the new anomaly.

If the checking result is positive then, as indicated at box 940, the method may include, for example, discarding the new anomaly candidate.

Conversely, if the checking result is negative then, as indicating at box 1050, the method may include, for example, storing the new anomaly candidate in an anomaly repository.

As indicated at box 960, the method may optionally include, for example, compacting the anomaly repository. This may include, for example, fusing together several anomaly candidates that describe the same anomaly in different terms or from different perspectives.

As indicated at box 970, the method may include, for example, correlating or associating anomalies. This may include, for example, determining ripple effects and causality between different anomalies that are correlated with the same root cause of the problem.

As indicated at box 980, the method may include, for example, calculating anomaly interestingness.

As indicated by arrow 985, the method may optionally include, for example, repeating some of the previous operations, e.g., the operations of box 920 and onward.

As indicated at box 990, the method may optionally include, for example, generating a problem alert based on the new anomaly candidate.

Figure 10:
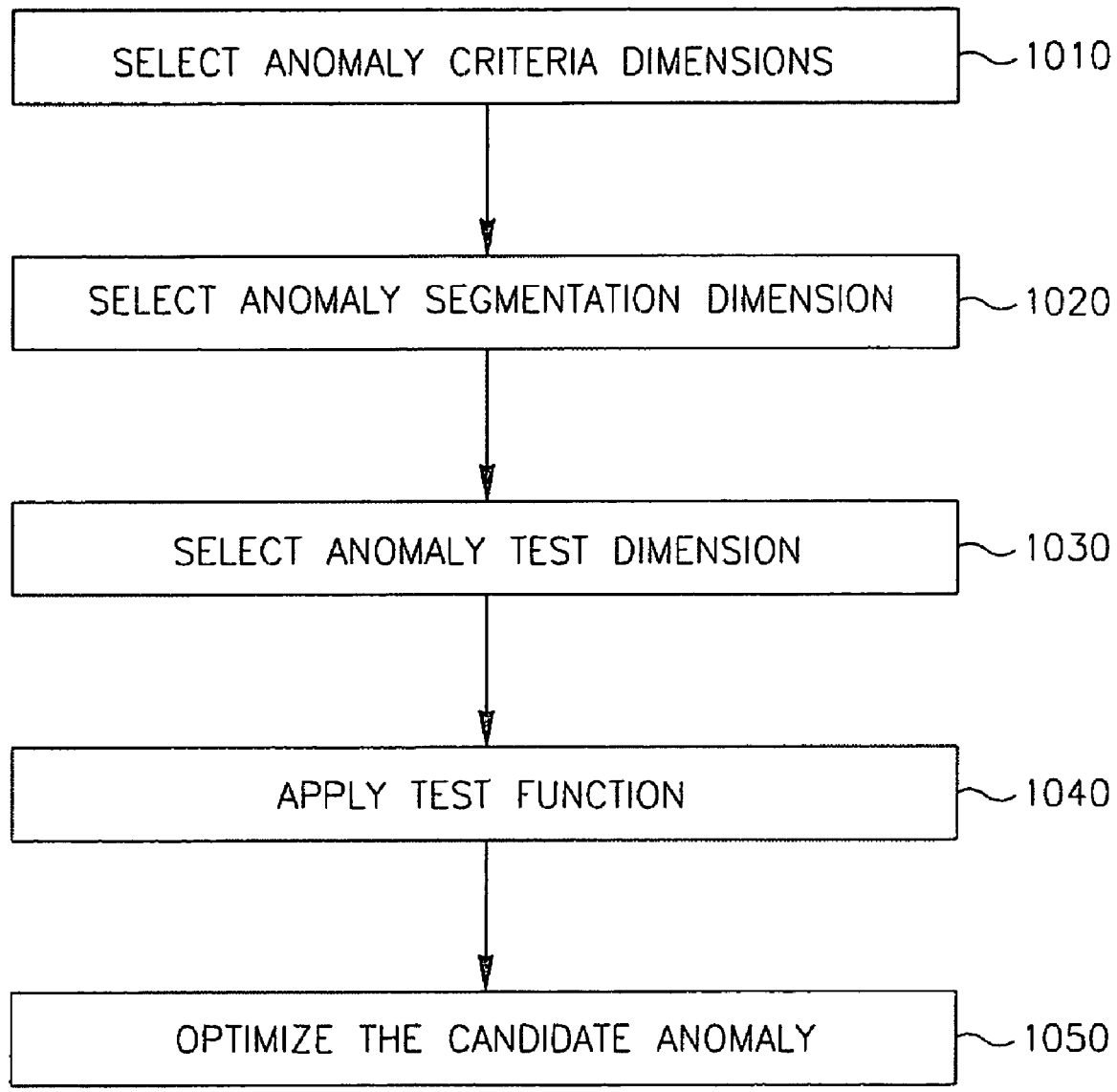
FIG. 10 is a flow-chart diagram of a method of generating candidate anomalies in accordance with some embodiments of the invention.

FIG. 10 is a flow-chart diagram of a method of generating candidate anomalies in accordance with some embodiments of the invention. The method may be used, for example, in conjunction with the system 100 of FIG. 1, the analyzer 120 of FIG. 1, and/or other suitable systems and devices. The method of FIG. 10 may be, for example, an implementation of the operations of box 920 of FIG. 9.

As indicated at box 1010, the method may include, for example, selecting one or more anomaly criteria dimensions, e.g., using a domain dimensions alphabet and value.

As indicated at box 1020, the method may include, for example, selecting an anomaly segmentation dimension, e.g., using a domain dimensions alphabet.

As indicated at box 1030, the method may include, for example, selecting an anomaly test dimension, e.g., using a domain dimensions alphabet and value.

As indicated at box 1040, the method may include, for example, applying a test function.

As indicated at box 1050, the method may optionally include, for example, optimizing the candidate anomaly, e.g., by applying local optimization. Local optimization may modify anomaly candidate characteristics, such that the anomaly candidate may better reflect the anomaly. This may include, for example, discarding surplus information, or fine-tuning attributes descriptions.

Figure 11:
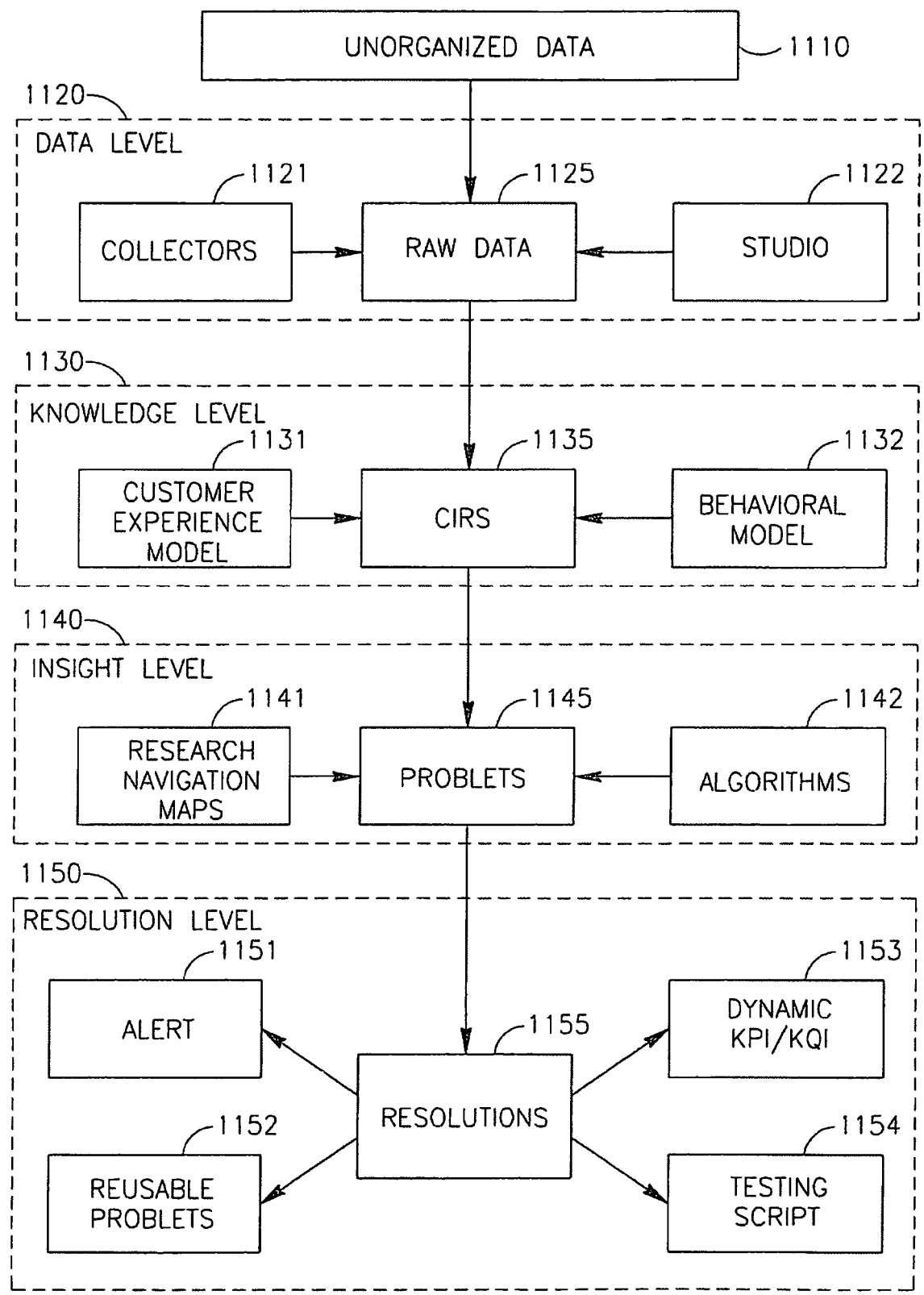
FIG. 11 schematically illustrates an end-to-end anomaly detection process in accordance with some embodiments of the invention.

FIG. 11 schematically illustrates an end-to-end anomaly detection process in accordance with some embodiments of the invention. The process may be used, for example, using a software and/or hardware implementation of one or more of the above-mentioned devices and/or methods, or may use or include one or more of the above-mentioned devices and/or methods.

The process may, for example, handle unorganized data 1110 using one or more levels, e.g., a data level 1120, a knowledge level 1130, an insight level 1140, and a resolution level 1150.

At the data level 1120, for example, collectors 1121 and a studio 1122 may convert unorganized data 1110 into raw data 1125.

At the knowledge level 1130, a customer experience model 1131 and a behavioral model 1132 may convert raw data 1125 into CIRs 1135.

At the insight level 1140, for example, research navigation maps 1141 and algorithms 1142 may construct problets 1145, e.g., based on CIRs 1135.

At the resolution level 1150, resolutions 1155 may be determined from problets 1155; for example, an alert 1151 may be generated, reusable problets 1152 may be identified and/or stored, dynamic KPIs/KQIs 1153 may be generated, and a testing script 1154 may be applied.

Some embodiments of the invention may be used, for example, in the field of mobile telecommunications. For example, a first person ("sender") may use a first mobile phone to send a Multimedia Messaging Service (MMS) message to a second person ("receiver"), who may download the MMS message using a second mobile phone. The MMS may include, for example, a MMS Center (MMSC) able to supply and store the content of the MMS message, and a WAP GateWay (WAPGW) which may be used for retrieving images from the MMSC. Therefore, the MMSC may operate in a sending actions and retrieving actions, whereas the WAPGW may operate in retrieving actions. Furthermore, one "send" operation there may correspond to several "retrieve" operations, e.g., if the receiver fails to retrieve the message on a first try.

Analyzer 120 of FIG. 1 may be used, for example, to monitor the MMS "send" activity, e.g., sending MMS messages. The collector module 121 may be associated with two collection agents 151-152, for example, a first collection agent to collect data from the WAPGW and a second collection agent to collect data from the MMSC. For example, one of the two collection agents may be configured to collect data directly from the MMSC log, whereas the other collection agent may obtain data from the WAPGW through an HTTP interface.

Two data objects may be defined to store the collected information (e.g., using a database); for example, each data component may be mapped into a table. The two data objects may be, for example, a first table representing the MMSC data component, and a second table representing the WAPGW data component. Each table may include, for example, data indicating a transaction number, the date and time of the transaction, the size of the content transferred in the transaction, the type of handset involved in the transaction, and a success status.

In some embodiments, a context may be defined, for example, the context "P2P MMS". This context defines the borders of interest of system 100 in a specific action, e.g., the MMS transaction. For every context, system 100 may create a CIR; for example, the CIR may be built from the MMSC data component and WAPGW data component. In one embodiment, for example, the seed data component may be the MMSC data component.

The building rule for creating the CIR may be, for example, "Join the WAPGW data component to the MMSC data component if they have the same 'Transaction Number' item". The resulting CIR may thus include data item (e.g., a row in an embodiment using a table or table-like implementation) from a single MMSC data component, and data items (e.g., rows in an embodiment using a table or table-like implementation) from one or more WAPGW data components (e.g., depending on whether there are multiple retrieval operations for the same MMS message). Optionally, the CIR may further include, for example, one or more pointers to the original raw data, or to the original data component. The builder module 123 of FIG. 1 may further create and calculate (and optionally, include in the CIR) new data items, for example, the total number of retrieves (e.g., by counting how many WAPGW data components are linked to, or correspond to, a MMSC data component).

Analyzer 120 of FIG. 1 may define one or more dimensions, for example: the handset type data item; a calculated total number of linked WAPGW data components; a content type; a success status; or the like.

Analyzer 120 may generate a CIR for substantially every MMS transaction that occurs in monitored mobile telecommunication system. For example, the proactor module 125 may scan the CIRs repository 124, e.g., searching for anomalies. In one embodiment using a GA as the combinatorial algorithm for creation of characterized individuals, a "chromosome" may have a criteria dimension, a segmenting dimension, and a testing dimension. The criteria dimension may include, for examples, "transactions from the last month", "images of JPEG type", or other criteria to direct the GA to inspect different types or portions of populations. In one embodiment (e.g., as shown Table 1), the segmenting dimension may be "Handset Type" with possible values of "Motorola", "Nokia" and "Sony", whereas the testing dimension may be "Success Code" with possible values of "OK" and "Failed".

Table 1 described above may represent the anomaly testing function. Each cell in the table may indicate the percentage, out of the total testing dimension population, that each segmenting dimension represents. For example, as shown in Table 1 above, out of the total transactions using Motorola handsets, 88 percent of such transactions succeeded. However, as shown in Table 1, Sony handsets show a low level of success rate (4 percent) and a high level of failure rate (96 percent) comparable to the other sub-populations of the segmenting dimension. Therefore, the "Handset Type" dimension may allows dividing the general population to sub-populations based on the handset type used, and provides a clue that there is a problem with a certain handset type.

Therefore, the proactor module 125 of FIG. 1 may generate an alert, e.g. "there is an anomaly in the population of JPEG content in the last month with Sony handsets comparable with other handset types". Anomalies detected by the analyzer 120 may have a finer grained population, for example, "there is an anomaly in the population of JPEG type, having a content size bigger than 120 kilobytes, in the North region, for customers having a Preferred status, for transactions that were tunneled though a router number 1530".

The troubleshooter module 126 may be used to research the anomaly alert and to inspect the defined population. For example, a user may view the population using a "good"/ "bad" analysis, such that a first group may include the transactions that failed and a second group may include the transactions that succeeded. The user may detect, for example, that in substantially all the failed transactions, the content size is above 300 kilobytes, thereby concluding Sony handsets fail when the MMS content size is above 300 kilobytes.

Figure 12:
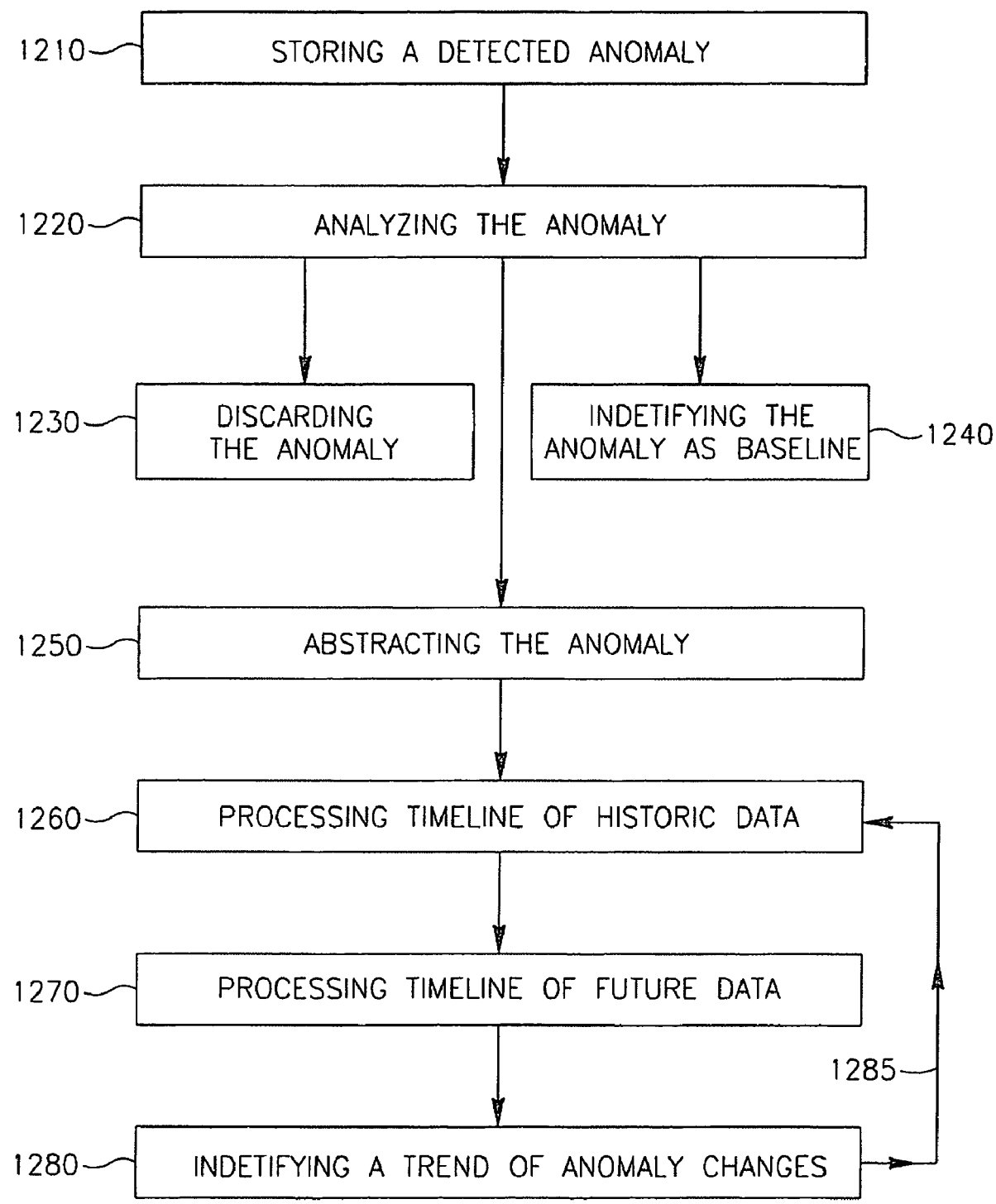
FIG. 12 is a flow-chart diagram of a method of handling anomalies in accordance with some embodiments of the invention.

FIG. 12 is a flow-chart diagram of a method of handling anomalies in accordance with some embodiments of the invention. The method may be used, for example, in conjunction with the system 100 of FIG. 1, the analyzer 120 of FIG. 1, and/or other suitable systems and devices. In one embodiment, the method of FIG. 12 may be performed, for example, after the operations of box 980 of FIG. 9

As indicated at box 1210, the method may include, for example, storing a detected anomaly, e.g., in an anomaly table or repository.

As indicated at box 1220, the method may include, for example, analyzing or evaluating the anomaly, e.g., by a user.

As indicated at box 1230, the method may optionally include, for example, discarding the anomaly based on the analysis of box 1220, e.g., due to redundancy between the detected anomaly and another anomaly, due to a lack of interest, or other reasons.

Conversely, as indicated at box 1240, the method may optionally include, for example, designating (or marking or identifying) the anomaly (e.g., based on the analysis of box 1220) as a baseline anomaly, e.g., a native or natural facet (or aspect, or feature) of the system. For example, an anomalous behavior of a monitored system may be determined to be handled a given fact and not as an inappropriate behavior, e.g., due to design constraints or other constraints. Therefore, a user may identify such system phenomena that may be known and need not be flagged as problematic.

As indicated at box 1250, the method may include, for example, abstracting the anomaly, e.g., by creating a problet based on the anomaly. The problet may include an abstraction of the problem or anomaly, and may represent substantially all occurrences of the same anomalous behavior, and not necessarily the specific anomaly that was detected. A problet may include an abstract description that will allow further (e.g., future) detection of the anomaly or similar anomalies, e.g., using a fingerprint. Once a problet is created, the problem or anomaly transforms from previously unknown problem into a known problem.

As indicated at box 1260, the method may optionally include, for example, processing timeline history by searching historic CIR data to gather information about occurrence of the anomaly in the past (e.g., if the anomaly was not detected in the past).

As indicated at box 1270, the method may include, for example, processing future timeline, by periodically scanning substantially all problets and CIR information to check if the detected anomaly re-occurs.

In some embodiments, the operations of boxes 1260 and 1270 may optionally include creating and using a timeline for a problet and the anomalies that it represents, e.g., to monitor and track the strength and occurrence patterns of a problem.

As indicated at box 1280, the method may include, for example, identifying trends of anomalies, e.g., if anomalies strengthen or weaken over time. Optionally, a threshold may be defined and used so that an alert may be generated when an anomaly exhibits a certain trend, or when an anomaly weakens or strengthens above or below a certain threshold.

As indicated by an arrow 1285, the method may optionally include, for example, repeating (e.g., periodically or substantially continuously) some or of the above operations, e.g., the operations of box 1260 and onward.

Figure 13:
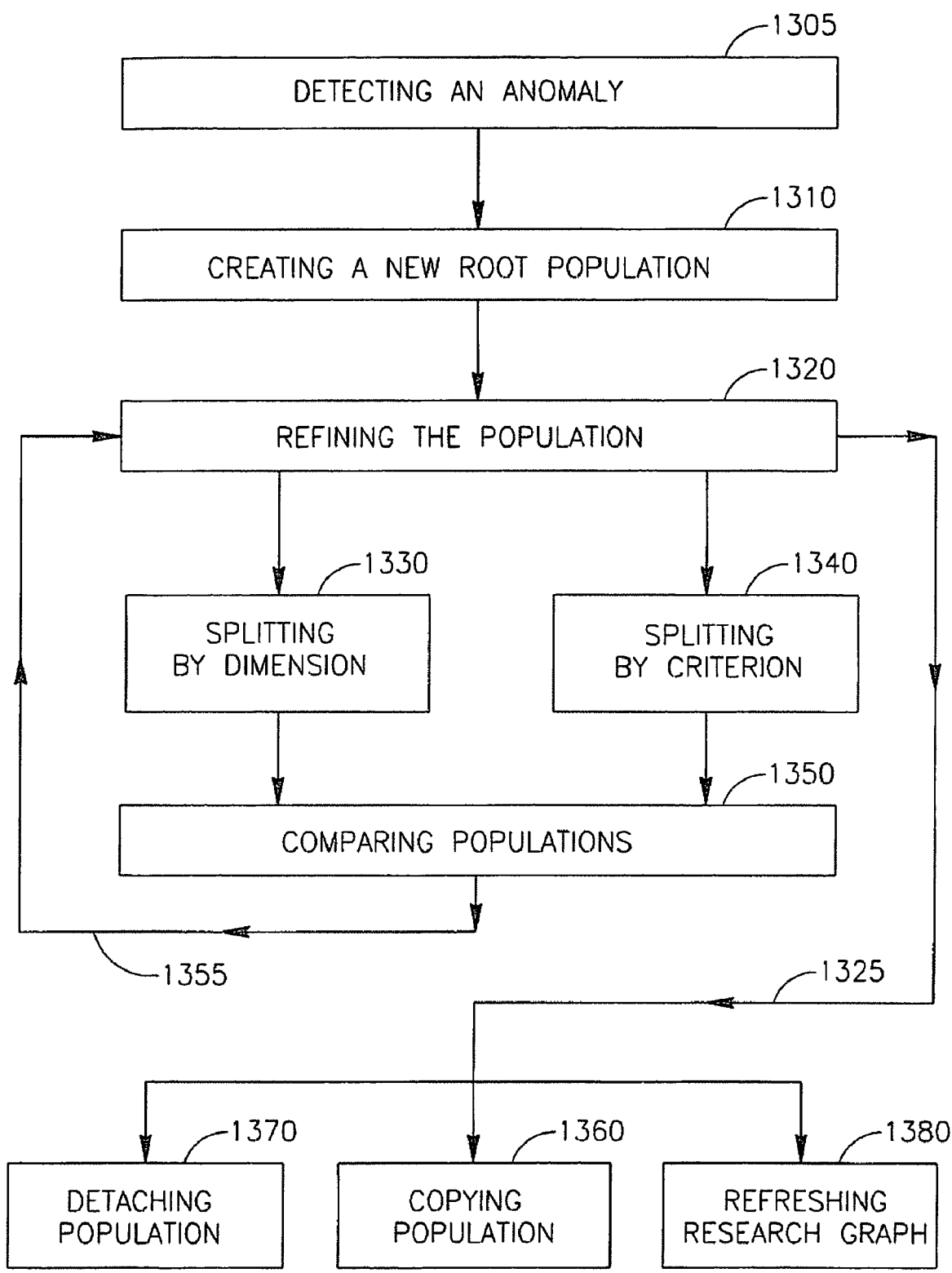
FIG. 13 is a flow-chart diagram of a method of researching in accordance with some embodiments of the invention.

FIG. 13 is a flow-chart diagram of a method of researching in accordance with some embodiments of the invention. The method may be used, for example, in conjunction with the system 100 of FIG. 1, the analyzer 120 of FIG. 1, the troubleshooter module 126 of FIG. 1, and/or other suitable systems and devices.

The method may be used in conjunction with a research graph, for example, to allow a user to conduct research based on anomalies found by the proactor module 125 or based on external information (e.g., a customer care trouble ticket).

In some embodiments, the research graph may include multiple nodes, each node representing a certain (e.g., highly characterized) population or sub-population under the scrutiny of a specific analysis tool to evaluate the population. The method may substantially continuously refine populations, for example, to expose new vantage points about the problem at hand, e.g., until root cause resolution.

In some embodiments, the method may include "good"/"bad" analysis, by which a population may be divided into two major sub-groups, the "bad" and the "good". The researcher may try to detect the commonalities and differences between the two populations. For example, looking at two populations (or groups) of MMS transactions, the sub-population of transactions that failed might show that certain handset types failed more than other handset types. Using the "good"/"bad" analysis tools, it may be detected that a certain browser (e.g., Java 2 Micro Edition (J2ME) browser) is common to all (or substantially all) handsets types, and the research may be directed towards a certain technology (e.g., J2ME technology).

As indicated at box 1305, the method may optionally include, for example, detecting an anomaly (e.g., by the proactor module 125).

As indicated at box 1310, the method may include, for example, creating a new root population. The root population may include sub-populations that further refine its characteristic. A population may be characterized by one or more attributes of its member CIRs.

As indicated at box 1320, the method may include, for example, refining the population. For example, a new root population can be created based on information available to a researcher from external sources (e.g., trouble ticket information) or based on the anomaly detected in box 1305.

As indicated at box 1330, the method may optionally include, for example, splitting or dividing the population into multiple sub-populations, e.g., each sub-population being or representing a separate node, based on a dimension value. For example, a split by "handset type" dimension of a population, having CIRs with "Nokia 6100", "Nokia 6600" and "Motorola 125", may result in three sub-populations.

Additionally or alternatively, as indicated at box 1340, the method may optionally include, for example, splitting or dividing the population into two (or more) sub-populations based on an explicit criterion, and not necessarily a dimension value. The system may automatically create a complementary "bad" group; for example, if the user specifies a sub-group attribute of "premium customers", then a second, complementary sub-group may be created to include all customers who are not "premium customers".

As indicated at box 1350, the method may include, for example, comparing two (or more) sub-populations or groups, e.g., by comparing different statistics and dimensions values between the sub-populations, evaluating a first sub-population against a second sub-population, detecting commonalities and/or differences between two or more sub-populations, or the like.

As indicated by an arrow 1355, the method may include, for example, repeating one or more of the above operations, e.g., the operations of box 1320 and onward.

Optionally, as indicated by an arrow 1325, other operations may be performed once a population is defined (e.g., by the operations of box 1320). For example, a population may be copied (box 1360) or otherwise re-used, e.g., for creation of a new research direction starting from the same point, leaving the original population intact. Additionally or alternatively, a population may be detached (box 1370); for example, a population may be used for creation of a new root, thereby erasing the original population from its original location.

Additionally or alternatively, as indicated at box 1380, the method may optionally include refreshing the research tree or research graph. For example, as the research proceeds, the research graph may include multiple nodes under each root node which are linked dynamically to their respective root. The user may change the direction of the research, e.g., by changing a characteristic of one or more parent nodes or root nodes; other related nodes (e.g., sibling nodes or lower nodes) may be refreshed and may adjust their criteria, e.g., by inheriting the changes or otherwise adapting to accommodate or match the changes.

Although part of the discussion herein may relate, for exemplary purposes, to detection of anomalies, problems, failures, "negative" symptoms or "negative" (e.g., undesired) behaviors, embodiments of the invention are not limited in this regard, and may include, for example, detection of "positive" (e.g., desired") symptoms or behavior, preferred behaviors, or the like. Furthermore, some embodiments need not detect anomalies, but rather may be used for active monitoring and viewing of complex, dynamic and/or large-scale environments. In some embodiments, the system may detect trends (e.g., modification trends, modification patterns, or the like) or changes (e.g., positive or negative changes) in anomalies life cycle.

Some embodiments may include, for example, identification and reporting of flow-related, functional and/or logical problems in business processes. Some embodiments may include a "model-free" solution, e.g., capability to detect and resolve previously undefined problems. For example, system 100 may have substantially no assumptions on a set of pre-defined problems, and may detect anomalies and problems which have not been previously defined.

Some embodiments may allow an end-to-end view of services, by creating aggregated data structures (CIRs) that describe the service's functional and logical health and provide a focal point with an end-to-end view of the service.

Some embodiments may include adaptable models backed by problem domain (e.g., mobile communications) knowledge, which may include models and methodology that are specific for the investigated domain. The models may include behaviors, experiences, and a set of pre-built components that ease the integration of the monitoring system with the operators' technical infrastructure.

Some embodiments may allow reconstruction of customers' experiences using aggregation, correlation and knowledge-based technique. The monitoring system may manage and identify the experiences or problems of individual customers, or larger populations with specific characteristics, in substantially real-time. Once experience semantics are defined, they may be used throughout the system. For example, the analyzer 120 of FIG. 1 may detect customer populations exhibiting certain experiences, or research (e.g., using the troubleshooter module 126) may be conducted using experience semantics, e.g., "show me all customers in the North who have a low value of 'system responsiveness' parameter"), thereby providing visibility into customer experiences. The troubleshooter module 126 includes research tools that reduce the complexity of the research process, e.g., by allowing automation and insights from raw data.

Some embodiments may detect, research and/or resolve anomalies and problems that influence the experience of an individual customer while using a service, for example: the customer did not receive an MMS message that was sent to him; the customer did not receive a news alert; the customer cannot login into a game; the customer cannot download an application or a ringtone; the customer experiences a slow download time of a lava game or an application; the quality of download is not high, or not good; the customer cannot connect using General Packet Radio Service (GPRS); or other problems.

Some embodiments may detect, research and/or resolve anomalies and problems that influence the experience of a group (e.g., a population or sub-population) of customers while using a service, for example: certain content cannot be retrieved by mobile users; certain phone models or handsets are not able to access or receive a certain service; slow or low-quality GPRS connection in a certain geographical area (e.g., the north area of a country or state); in the last 12 hours, a large number of MMS messages are not delivered; a specific application does not allow login or does not function; customers registered to a new service are not able to access it; or other problems.

In one embodiment, for example, a failure may occur in a server (e.g., a SMSC server) that handles SMS messaging between customers. If a mobile operator monitors the health of the SMS service, he may check the average successful SMS messages that are sent via the SMSC server. For example, if the SMSC server will have a general problem and 30 percent of the users are not able to send SMS messages, then the mobile operator may detect the problem. However, without using embodiments of the invention, the mobile operator may not detect that only customers in the north region fail to use the service. If the operator decided in advance to segment its KPIs taking geographical areas into consideration, then he may be able to notice that this not a general problem, but rather a specific problem in the north region. However, without using embodiments of the invention, the mobile operator may not detect that the problem is caused due to compatibility problems between the SMSC server to a specific handset model (e.g., a certain Nokia model which uses a special internal software) operated by customers who use pre-paid mobile phones. The multitude of handsets, service components and changes in the technical habitat of mobile data services, the full spectrum of performance indicators may not be defined in advance, and a system in accordance with embodiments of the invention may be required and used. Some embodiments may allow, for example, detection of problems in a complex and dynamic environment, wherein the problems affect a small percent of customers having specific characteristics.

Some embodiments may dynamically build quality indicators that may detect previously undefined problems of small, highly-specific customer sub-populations. The dynamic quality indicators may be constructed based on real-world transaction usage data, or if available, information from synthetic transaction generation tools such as CEM systems, and may adapt itself to the actual system state. Information may further be received from other OSS systems, for example, a MoM system, a NMS, a SLM system, or other systems which may monitor a system's performance and/or state. The monitoring system may evolve quality indicators that are relevant, e.g., describe current system failure states. The monitoring system's quality indicators may have high granularity and may allow definition of highly characterized sub-populations and behaviors.

Some embodiments may detect and resolve chronic experience problems, eliminating the need to predefine experience problems and/or the need to monitor predefined symptoms. Some embodiments may provide a holistic, comprehensive, end-to-end view of the service and/or the delivery chain, and may allow runtime assurance of service experiences.

Other suitable operations or sets of operations may be used in accordance with embodiments of the invention.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

In some embodiment, for example, the analyzer 120 of FIG. 1 may be implemented using a computer or a computing platform, e.g., having a processor, a memory unit, a storage unit, an input unit (e.g., mouse or keyboard), an output unit (e.g., monitor), a network connection, or other suitable components.

Some embodiments of the invention may be implemented, for example, using a machine-readable medium or article which may store an instruction or a set of instructions that, if executed by a machine (e.g., by analyzer 120, by system 100, or by other suitable machines), cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, e.g., memory, volatile or non-volatile memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), Flash memory, a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. A method comprising:
creating one or more context insight records representing an indication of a behavior of a service based on raw footprint data related to use of said service by a population of users;
selecting at least one anomaly criteria dimension;
defining possible values for multiple dimensions of said one or more context insight records in response to a result of a scanning of said one or more context insight records;
analyzing, by an analyzer that is a hardware component, said one or more context insight records, in response to said at least one anomaly criteria dimension and to at least one of said possible values defined;
detecting based on said analyzing a dynamically defined anomaly of said service by generating a first generation of candidate anomalies by segmenting said one or more context insight records along a segmentation dimension of said raw footprint data;
generating a consecutive generation of candidate anomalies by modifying, adding or deleting one or more candidate anomalies of said first generation;
said consecutive generation of candidate anomalies further comprising:
modifying said first generation into said consecutive generation by activating a dimension of said one or more context insight records;
selecting, by the hardware analyzing, at least one of each types of dimensions of said context insight records said dimensions comprising: criteria, segmenting, and testing dimensions; wherein said criteria dimensions represent characteristics of at least one context insight record population; wherein said segmenting dimensions divide said at least one context insight record population into several sub-populations; wherein said testing dimensions comprise criteria by which different sub-populations of the segmenting dimensions are tested;
wherein the generating of at least one of the generations of candidate anomalies is response to, said criteria, segmenting and said testing dimensions selected by the hardware analyzer;
repeating generating consecutive generations of candidate anomalies until a convergence condition holds true; and
assisting in resolving a problem in the service in response to the dynamically defined anomaly.

2. The method of claim 1, further comprising:
inserting into said one or more context insight records a tag indicating a mapping of an item of said raw footprint data to a related behavior of said service.

3. The method of claim 1, further comprising:
dynamically generating a population description and a test to indicate a logical or functional property of said population based on said one or more context insight records.

4. The method of claim 1, further comprising:
dynamically generating a population description and a test to indicate a quality-of-service associated with said population based on said one or more context insight records.

5. The method of claim 1, further comprising:
calculating a fitness parameter indicating a support level for said at least one candidate anomaly in said one or more context insight records based on an anomaly test.

6. The method of claim 1, wherein modifying comprises:
discarding a candidate anomaly based on an exclusion rule.

7. The method of claim 1, further comprising:
associating between a first candidate anomaly having a first property and a second candidate anomaly having a second property, based on a relation between the first property and the second property.

8. The method of claim 1, further comprising:
grouping a plurality of candidate anomalies into a cluster based on a common property of said plurality of anomalies.

9. The method of claim 1, further comprising:
creating a criteria dimension representing a common characteristic of at least one of said candidate anomalies.

10. The method of claim 1, further comprising:
creating a testing dimension representing a criterion for testing at least one sub-group; and
testing at least one of said sub-groups using said testing dimension.

11. The method of claim 1, further comprising:
monitoring changes in said dynamically defined anomaly over time; and
determining a trend of said anomaly based on said changes.

12. The method of claim 1, further comprising:
after detecting said dynamically defined anomaly, waiting a time period and checking whether said anomaly persists.

13. The method of claim 1, further comprising:
collecting said raw footprint data from said population of users of said service.

14. The method of claim 1, further comprising:
splitting a population associated with said dynamically defined anomaly into a plurality of groups; and researching said anomaly by evaluating a first group of said plurality of groups in relation to a second group of said plurality of groups.

15. The method according to claim 1 wherein the generating of an alert comprises generating an alert if a service performance breaches a service level agreement.

16. The method according to claim 1 wherein the assisting comprises utilizing an analyzer to fix, correct or resolve functional or logical problems.

17. The method according to claim 1 wherein the assisting comprises providing an end-to-end view about an experience of a certain user of the service by creating aggregated data structures that describe the service's functional and logical health and providing a focal point with an end-to-end view of the service.

18. An apparatus comprising:
an analyzer, that is a hardware component and is configured to create one or more context insight records representing an indication of a behavior of a service based on raw footprint data related to use of said service by a population of users, to select at least one anomaly criteria dimension; to define possible values for multiple dimensions in response to a result of a scanning of the one or more context insight records; and to analyze, in response to the at least one anomaly criteria dimension and to at least one of the possible values defined, said one or more context insight records to detect a dynamically defined anomaly of said service; wherein during an analysis of said one or more context insight the analyzer is configured to:
generate a first generation of candidate anomalies by segmenting said one or more context insight records along a segmentation dimension of said raw footprint data;

generate a consecutive generation of candidate anomalies by modifying, adding or deleting one or more candidate anomalies of said first generation;

and repeat generating consecutive generations of candidate anomalies until a convergence condition holds true, wherein the system is configured to assist in resolving a problem in the service in response to the dynamically defined anomaly;

wherein the analyzer is configured to activate a dimension of said one or more context insight records to modify said first generation into said consecutive generation;

wherein the analyzer is configured to generate at least one of the generations of candidate anomalies in response to multiple types of dimensions, that comprise criteria dimensions, segmenting dimensions, and testing dimensions, wherein the criteria dimensions represent characteristics of at least one context insight record population; wherein the segmenting dimensions divide the at least one context insight record population into several sub-populations; wherein the testing dimensions comprise criteria by which the different sub-populations of the segmenting dimensions may be tested; wherein at least one dimension of the criteria dimensions, the segmenting dimensions, and the testing dimensions is a dimension selected by the analyzer.

19. The apparatus of claim 18, wherein said analyzer is configured to insert into said one or more context insight records a tag indicating a mapping of an item of said raw footprint data to a related behavior of said service.

20. The apparatus of claim 18, wherein said analyzer is configured to dynamically generate a population description and a test to indicate a logical or functional property of said population based on said one or more context insight records.

21. The apparatus of claim 18, wherein said analyzer is configured to dynamically generate a population description and a test to indicate a quality-of-service associated with said population based on said one or more context insight records.

22. The apparatus of claim 18, wherein said analyzer is configured to activate a dimension of said one or more context insight records to modify said first generation into said consecutive generation.

23. The apparatus of claim 18, wherein said analyzer is configured to calculate a fitness parameter indicating a support level for said at least one candidate anomaly in said one or more context insight records based on an anomaly test.

24. The apparatus of claim 18, wherein said analyzer is configured to discard a candidate anomaly based on an exclusion rule.

25. The apparatus of claim 18, wherein said analyzer is configured to associate between a first candidate anomaly having a first property and a second candidate anomaly having a second property, based on a relation between the first property and the second property.

26. The apparatus of claim 18, wherein said analyzer is configured to group a plurality of candidate anomalies into a cluster based on a common property of said plurality of anomalies.

27. The apparatus of claim 18, wherein said analyzer is configured to create a criteria dimension representing a common characteristic of at least one of said candidate anomalies.

28. The apparatus of claim 18, wherein said analyzer is configured to create a testing dimension representing a criterion for testing at least one sub-group, and to test at least one of said sub-groups using said testing dimension.

29. The apparatus of claim 18, wherein said analyzer is configured to monitor changes in said dynamically defined anomaly over time, and to determine a trend of said anomaly based on said changes.

30. The apparatus of claim 18, wherein said analyzer is configured to wait a time period after detecting said dynamically defined anomaly, and to check whether said anomaly persists.

31. The apparatus of claim 18, comprising a collector that is configured to collect said raw footprint data from said population of users of said service.

32. The apparatus of claim 18, wherein said analyzer is configured to split a population associated with said dynamically defined anomaly into a plurality of groups, and to research said dynamically defined anomaly by evaluating a first group of said plurality of groups in relation to a second group of said plurality of groups.

33. The apparatus of claim 18, wherein the analyzer is configured to generate at least one of the generations of candidate anomalies by generating at least one of the candidate anomalies by activating new dimensions that were not used for previous generations.

34. The apparatus of claim 18, wherein the analyzer is further configured to construct individual objects in response to at least one population of the context insight records, wherein population characteristics of at least one of the context insight records populations are part of the attributes of at least one of the individual objects; and to evaluate at least one of the individual objects according to an evaluation function for assisting in resolving a problem in the service in response to the dynamically defined anomaly.

35. The apparatus of claim 18, wherein the analyzer is further configured to construct at least one first context insight record from one or more other context insight records wherein the constructing comprise aggregating data of the one or more other context insight records; wherein the analyzer is configured to analyze at least one first context insight record to detect the dynamically defined anomaly of said service.

36. A machine-readable medium having stored thereon a set of instructions that, if when executed by a machine, cause the machine to perform a method comprising:

creating one or more context insight records representing an indication of a behavior of a service based on raw footprint data related to use of said service by a population of users;

selecting at least one anomaly criteria dimension;

defining possible values for multiple dimensions in response to a result of a scanning of the one or more context insight records;

analyzing said one or more context insight records, in response to said at least one anomaly criteria dimension and to at least one of said possible values defined;

detecting based on said analyzing a dynamically defined anomaly of said service by generating a first generation of candidate anomalies by segmenting said one or more context insight records along a segmentation dimension of said raw footprint data;

generating a consecutive generation of candidate anomalies by modifying, adding or deleting one or more candidate anomalies of said first generation;

wherein generating the consecutive generation comprises:

activating a dimension of said one or more context insight records to modify said first generation into said consecutive generation;

wherein the generating of at least one of the generations of candidate anomalies is response to multiple types of dimensions, that comprise criteria dimensions, segmenting dimensions, and testing dimensions; wherein the criteria dimensions represent characteristics of at least one context insight record population; wherein the segmenting dimensions divide the at least one context insight record population into several sub-populations; wherein the testing dimensions comprise criteria by which the different sub-populations of the segmenting dimensions may be tested; wherein at least one dimension of the criteria dimensions, the segmenting dimensions, and the testing dimensions is a dimension selected by the hardware analyzer;

repeating generating consecutive generations of candidate anomalies until a convergence condition holds true; and assisting in resolving a problem in the service in response to the dynamically defined anomaly.

37. The machine-readable medium of claim 36, wherein the instructions further result in:

inserting into said one or more context insight records a tag indicating a mapping of an item of said raw footprint data to a related behavior of said service.

38. The machine-readable medium of claim 36, wherein the instructions result in:

dynamically generating a population description and a test to indicate a logical or functional property of said population based on said one or more context insight records.

39. The machine-readable medium of claim 36, wherein the instructions further result in:

dynamically generating a population description and a test to indicate a quality-of-service associated with said population based on said one or more context insight records.

* * * * *